US012589400B1

(12) United States Patent
Lai

(10) Patent No.: US 12,589,400 B1
(45) Date of Patent: Mar. 31, 2026

(54) LIQUID PUMPING DEVICE AND LIQUID REFILLING APPARATUS

(71) Applicant: ZHONGSHAN PEILI TECHNOLOGY CO., LTD., Zhongshan (CN)

(72) Inventor: Chunlai Lai, Ruijin (CN)

(73) Assignee: ZHONGSHAN PEILI TECHNOLOGY CO., LTD., Zhongshan (CN)

(*) Notice: Subject to any disclaimer, the term of this patent is extended or adjusted under 35 U.S.C. 154(b) by 0 days.

(21) Appl. No.: 19/395,279

(22) Filed: Nov. 20, 2025

(30) Foreign Application Priority Data

Oct. 24, 2025 (CN) ......................... 202522261263.4

(51) Int. Cl.
*B05B 9/04* (2006.01)
*B05B 12/00* (2018.01)

(52) U.S. Cl.
CPC .......... *B05B 9/0426* (2013.01); *B05B 12/002* (2013.01)

(58) Field of Classification Search
CPC ............................ B05B 9/0426; B05B 12/002
USPC ................................. 222/251; 417/234, 321
See application file for complete search history.

(56) References Cited

U.S. PATENT DOCUMENTS 2,865,293 A * 12/1958 Laing ...................... F04D 33/00 417/240
2,865,295 A * 12/1958 Laing ........................ F04D 3/00 417/234
2,868,132 A * 1/1959 Rittershofer ............ F04D 13/02 417/234
4,570,833 A * 2/1986 Vanderjagt ............ F04B 53/106 417/269
D296,103 S * 6/1988 Harvey ............................ D15/7
4,925,105 A * 5/1990 Lin ....................... B05B 9/0861 239/154
5,470,305 A * 11/1995 Arnett .................. A61M 1/774 601/161
6,179,558 B1 * 1/2001 Eastman, III .......... B01D 46/00 415/121.2
6,281,457 B1 * 8/2001 Chang .................. H01R 13/701 200/50.01

(Continued)

FOREIGN PATENT DOCUMENTS

WO WO-2020062872 A1 * 4/2020 ............... A61L 9/14
WO WO-2022232866 A1 * 11/2022 ............ A47K 3/285

*Primary Examiner* — Paul R Durand
*Assistant Examiner* — Michael J. Melaragno
(74) *Attorney, Agent, or Firm* — HOWARD M COHN and Associates, LLC

(57) ABSTRACT

The present disclosure discloses a liquid pumping device and a liquid refilling apparatus. The liquid pumping device includes a pump body for pumping liquid from the container; a pipe connected to the pump body for transporting the liquid; and a grip portion connected to a distal end of the pipe away from the pump body. The grip portion is connected to and capable of controlling the pump body. The grip portion includes a swing plate and a plurality of power supply interfaces, the plurality of power supply interfaces at least include a first power supply interface and a second power supply interface of different types. The swing plate is movable to exposes the first power supply interface and covers the second power supply interface in a first position, and exposes the second power supply interface and covers the first power supply interface in a second position.

19 Claims, 15 Drawing Sheets

(56) References Cited

U.S. PATENT DOCUMENTS 6,447,261 B1 * 9/2002 McCook ................. F04B 17/06
417/234
8,347,926 B2 * 1/2013 Voss, III ............ B60K 15/0406
141/323
9,497,953 B2 * 11/2016 Mitchell ............... B05B 9/0426
11,466,689 B1 * 10/2022 Lai ........................ F04D 29/086
11,994,131 B2 * 5/2024 Arkwright .......... F04D 29/4293
12,145,836 B1 * 11/2024 Lai ........................... B67D 7/04
12,157,138 B2 * 12/2024 Kinne ..................... B05B 9/043
12,172,180 B2 * 12/2024 Kinne ................... B05B 9/0413
12,319,559 B1 * 6/2025 Lai ........................... B67D 7/62
2005/0244287 A1 * 11/2005 Dobrynski .............. F04B 17/03
417/423.3
2006/0039800 A1 * 2/2006 Saunders ................ B63B 13/00
417/234
2006/0216156 A1 * 9/2006 Oakley ................... F04B 17/06
417/234
2013/0175363 A1 * 7/2013 Dobias .................... B05B 15/62
220/676
2014/0230958 A1 * 8/2014 Bonner .................... B67D 7/60
141/59
2014/0240967 A1 * 8/2014 Sharrah ..................... F21L 4/08
362/183
2017/0027151 A1 * 2/2017 Mitchell ................ A01C 15/02
2019/0192989 A1 * 6/2019 Kelly ...................... A63H 33/28
2019/0388923 A1 * 12/2019 Giacalone ............... B05B 12/00
2021/0078026 A1 * 3/2021 Suardika ............. B05B 11/0056
2021/0291209 A1 * 9/2021 Audette ................ B05B 9/0861
2022/0120293 A1 * 4/2022 Henton ................... F04D 13/08
2022/0134367 A1 * 5/2022 Hardy ........................ F24F 8/90
239/307
2022/0349157 A1 * 11/2022 Brown ...................... E03B 3/03
2022/0379328 A1 * 12/2022 Crawford .............. B05B 9/0861
2023/0167792 A1 * 6/2023 Bykowski .......... F02M 37/0076
123/198 C
2024/0000027 A1 * 1/2024 Gergek ................ A01G 25/162
2024/0001384 A1 * 1/2024 Li ......................... B05B 9/0861
2024/0293832 A1 * 9/2024 Kinne ..................... B05B 1/302
2024/0316577 A1 * 9/2024 Kinne ..................... B05B 12/00
2025/0065349 A1 * 2/2025 Kinne ..................... B05B 9/043
2025/0065350 A1 * 2/2025 Kinne ................... B05B 12/002
2025/0155041 A1 * 5/2025 Lai .......................... F16K 24/04
2025/0229946 A1 * 7/2025 Li ......................... F04B 23/025
2025/0230031 A1 * 7/2025 Snyder ..................... B67D 7/84
2025/0230808 A1 * 7/2025 Lockhart ............... F04B 49/065
2025/0233254 A1 * 7/2025 Li ....................... H01M 50/271
2025/0297611 A1 * 9/2025 Lindsey ................ F04D 13/068
2025/0361868 A1 * 11/2025 Eades ................... F04D 13/068

* cited by examiner

LIQUID PUMPING DEVICE AND LIQUID REFILLING APPARATUS

TECHNICAL FIELD

The present disclosure relates to the technical field of liquid refilling tools, and more specifically, to a liquid pumping device and a liquid refilling apparatus.

BACKGROUND

In the current field of liquid pumping devices, the flexibility and safety of power supply methods still need improvement. Although some devices attempt to provide multiple power supply interfaces to accommodate different usage scenarios, in actual designs, there is often a lack of effective management and protection mechanisms between different power supply interfaces. With multiple power supply interfaces exposed, this not only increases the risk of misoperation but also exposes the device to challenges in circuit safety and interface protection in complex usage environments.

SUMMARY

The present disclosure provides a liquid pumping device, capable of enabling both diversified power supply configurations and enhanced safety of power supply interfaces.

In a first aspect, the present disclosure provides a liquid pumping device, including:

a pump body configured to be disposed within a container for pumping liquid from the container;

a pipe connected to the pump body for transporting the liquid; and a grip portion connected to a distal end of the pipe away from the pump body, the grip portion being connected to the pump body and capable of controlling the pump body; wherein the grip portion includes a swing plate and a plurality of power supply interfaces, the plurality of power supply interfaces at least include a first power supply interface and a second power supply interface of different types, the swing plate is movable, and the swing plate exposes the first power supply interface and covers the second power supply interface in a first position, and exposes the second power supply interface and covers the first power supply interface in a second position.

Optionally, the grip portion further includes a base and a circuit board, the circuit board being disposed within the base, the circuit board having the first power supply interface and the second power supply interface, the base having a first opening and a second opening, the first opening being aligned with the first power supply interface, and the second opening being aligned with the second power supply interface;

the swing plate being rotatably connected to the base, the swing plate being configured to cover at least one of the first opening and the second opening, and the swing plate being configured to expose either the first opening or the second opening.

Optionally, the swing plate includes a plate body and an actuating portion, the plate body being disposed within the base, the actuating portion being disposed outside the base, the actuating portion being configured to drive rotation of the plate body, the plate body having a third opening and a fourth opening;

the first power supply interface being exposed when the third opening is aligned with the first opening, the second power supply interface being exposed when the fourth opening is aligned with the second opening.

Optionally, the swing plate covers the first power supply interface and the second power supply interface when the swing plate is rotated to a third position.

Optionally, the base includes a first limiting portion, the actuating portion includes a second limiting portion, and the first limiting portion and the second limiting portion are limitingly engageable with each other to limit the swing plate to at least one of the first position, the second position, and the third position.

Optionally, the first limiting portion includes a plurality of limiting protrusions, the second limiting portion includes a mating recess, the plurality of limiting protrusions are spaced apart and disposed on the base; and during rotation of the swing plate relative to the base, the mating recess is configured to engage with any one of the limiting protrusions to position the swing plate at the first position, the second position, or the third position.

Optionally, the swing plate further includes a rotation shaft, the plate body and the actuating portion are both connected to the rotation shaft, the actuating portion and the plate body are located on opposite sides of the base; and the actuating portion includes a first end and a second end opposite to each other, the first end being connected to the rotation shaft, the second end facing toward the base including the mating recess, the base including a plurality of the limiting protrusions protruding outwardly.

Optionally, the base includes a first sub-shell and a second sub-shell configured in a split configuration, the first sub-shell and the second sub-shell being assembled together to form the base, the first sub-shell including an outer plate and a bracket, the outer plate being located at an outermost side of the first sub-shell, the bracket being located inside the first sub-shell and opposite to the outer plate;

a rotation hole being configured on a side of the bracket facing the outer plate, the rotation shaft passing through the outer plate, and a portion of the rotation shaft being located within the rotation hole.

Optionally, the bracket includes a sidewall located on a side of the rotation hole facing toward the second sub-shell, the sidewall including a guiding portion configured to guide the rotation shaft into the rotation hole.

Optionally, the guiding portion includes a sloped surface, the sloped surface being inclined from the rotation hole toward the second sub-shell and away from the outer plate.

Optionally, an edge of the plate body includes a positioning groove facing toward the outer plate, the outer plate including a limiting block protruding toward the positioning groove, the limiting block being configured to engage with the positioning groove to limit rotation of the plate body; or an edge of the plate body facing toward the bracket including a positioning groove, the bracket including a limiting block protruding toward the positioning groove, the limiting block being configured to engage with the positioning groove to limit rotation of the plate body.

Optionally, he positioning groove includes a first slot wall and a second slot wall opposite the first slot wall along a rotation direction of the plate body, the first wall and the second wall being inclined and interconnected, the limiting block having a shape complementary to the positioning groove, and the first wall and the second wall being configured to restrict movement of the limiting block in the rotation direction of the plate body when the limiting block is located along the positioning groove.

Optionally, the base further includes two stop portions spaced apart along the rotation direction of the swing plate, the two stop portions being located on a rotation trajectory of the swing plate to limit a rotation range of the swing plate, and the plurality of limiting protrusions being located between the two stop portions.

Optionally, the plurality of limiting protrusions include a first limiting protrusion, a second limiting protrusion, and a third limiting protrusion, the second limiting protrusion being located between the first limiting protrusion and the third limiting protrusion along the rotation direction of the swing plate;

and wherein when the mating recess engages with the first limiting protrusion, the swing plate is in the first position; when the mating recess engages with the second limiting protrusion, the swing plate is in the second position; and when the mating recess engages with the third limiting protrusion, the swing plate is in the third position.

Optionally, the first limiting protrusion is adjacent to one of the stop portions, and the third limiting protrusion is adjacent to the other of the stop portions.

Optionally, the grip portion further includes a control switch connected to the circuit board, the control switch being configured to control the circuit board, the control switch and the first power supply interface being located on opposite sides of the grip portion.

Optionally, the first power supply interface includes one of a USB interface, a Type-C interface, a Micro-USB interface, and a Lightning interface, the second power supply interface including a DC interface.

Optionally, the grip portion further includes a battery compartment configured to accommodate one or more batteries; or the grip portion further includes a battery, the battery including a non-rechargeable battery or a rechargeable battery.

In a second aspect, the present disclosure also provides a liquid refilling apparatus, including:

a container for storing liquid; and a liquid pumping device as described above, mounted on the container and configured to output liquid from the container.

The present disclosure provides a liquid pumping device, wherein the pump body performs the pumping of liquid, and the pipe serves as a liquid transmission channel to guide the liquid pumped by the pump body to the outside of the container. The grip portion is connected to the end of the pipe that is away from the pump body. The grip portion not only provides a convenient holding point for the user but also enables the user to directly or indirectly control the working state of the pump body (for example, starting or stopping the pump body) through its functional connection with the pump body, making the operation more convenient. The grip portion is provided with multiple power supply interfaces, which at least include a first power supply interface and a second power supply interface of different types. For example, the first power supply interface may be a Type-C interface, and the second power supply interface may be a DC interface, configured to accommodate diverse external power sources to meet power supply requirements in different scenarios. The grip portion is also equipped with a movable swing plate, which can selectively expose or cover the power supply interfaces through its moving mechanism.

When the swing plate is in the first position, the first power supply interface is in an exposed and usable state, while the second power supply interface is covered by the swing plate. In this case, the user can power the device via the first interface. Conversely, when the swing plate switches to the second position, the second power supply interface is exposed for use, while the first interface is covered by the swing plate. This design ensures that only one of the first and second power supply interfaces is available at any given time, with the other being reliably covered, thereby guiding the user to correctly utilize the currently exposed and usable power supply method. Thus, the present disclosure, through the mechanism of the swing plate selectively exposing a single power supply interface, guarantee that the first and second power supply interfaces cannot be used simultaneously. This effectively prevents misinsertion errors that could arise from multiple power interfaces being exposed at the same time and fundamentally avoids circuit conflicts or device damage caused by the simultaneous connection of different power sources. For example, when the user chooses to power the device via the Type-C interface, the swing plate automatically covers the DC interface, preventing misinsertion while also protecting the unused power interface from external contaminants such as dust and liquids, thereby helping to extend the service life of the power interfaces. Moreover, when powering the liquid pumping device, the user does not need to distinguish or select between multiple power interfaces, and simply connecting to the exposed power interface provided by the swing plate allows for quick and intuitive use. This approach not only achieves diversification of power supply options but also enhances the safety and reliability of the liquid pumping device during power supply.

BRIEF DESCRIPTION OF DRAWINGS

To facilitate a clear understanding of the technical solutions in the embodiments of the present disclosure, the figures required for describing the embodiments will be briefly introduced below. It will be apparent that the figures described herein are merely examples of certain embodiments of the present disclosure, and other figures can be obtained by those skilled in the art without engaging in inventive effort based on these figures.

To comprehensively understand the present disclosure and its advantages, the following description will be provided with reference to the figures, wherein identical reference numerals denote identical components throughout the drawings.

Figure 1:
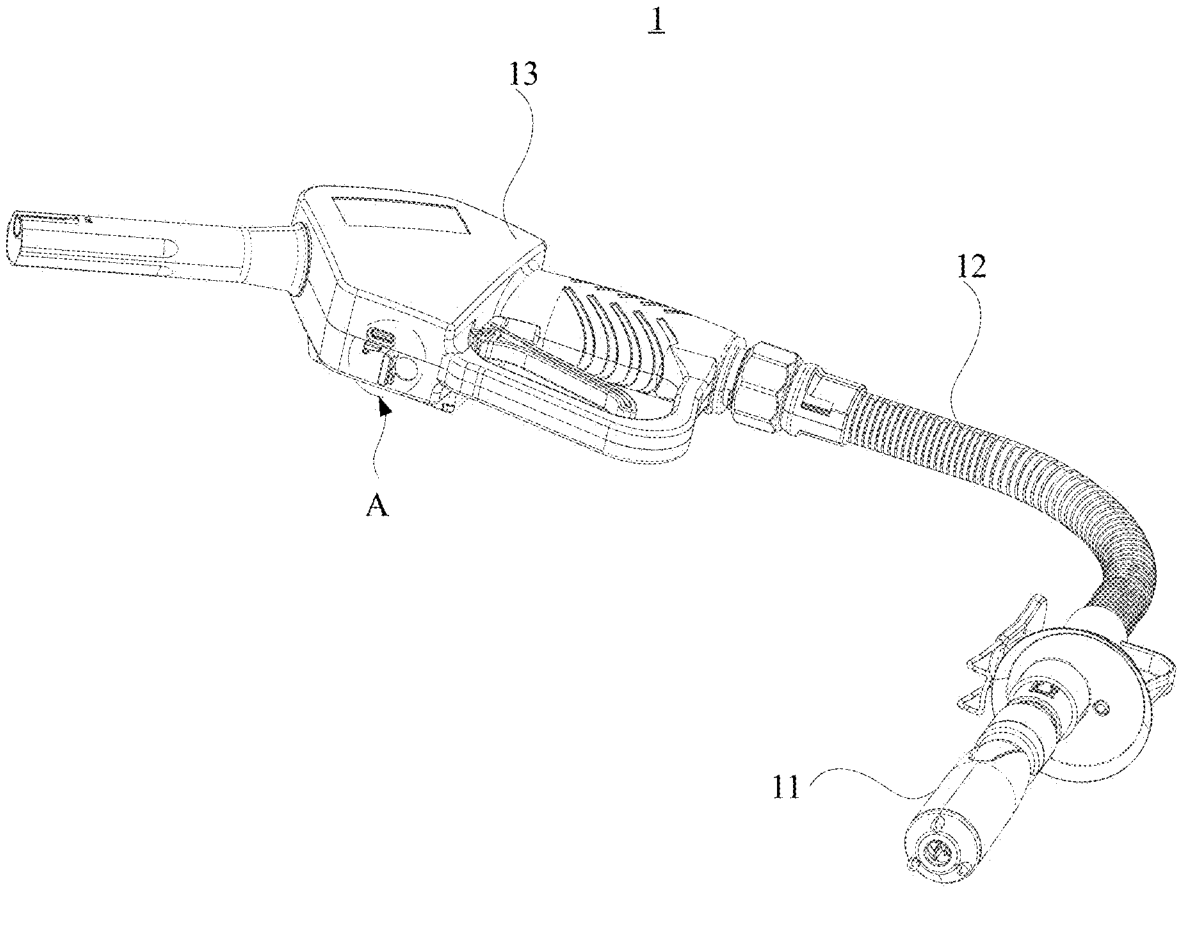
FIG. 1 is a schematic structural view of the liquid pumping device provided in the embodiment of the present disclosure.

The reference signs in the drawings are explained as follows:

1: liquid pumping device;

11: pump body;

12: pipe; 121: positioning grooves; 122: expandable portion;

13: grip portion; 131: operating lever; 132: automatic control circuit; 1322: sensor; 1324: control circuit; 133: control switch; 134: grip; 135: base; 1351: first opening; 1352: limiting protrusion; 1353: second opening; 1354: first sub-shell; 13542: outer plate; 13544: bracket; 13545: rotation hole; 13546: sidewall; 13547: guiding portion; 1356: second sub-shell; 1358: blocking portion; 136: liquid refill tube; 137: swing plate; 1372: plate body; 1373: third opening; 1374: fourth opening; 1375: positioning groove; 1376: actuating portion; 1377: mating recess; 1378: rotation shaft; 138: circuit board; 1382: first power supply interface; 1384: second power supply interface; 139: battery compartment;

14: mounting portion; 142: connecting portion; 1422: sleeve portion; 1423: perforated opening; 1424: spring tab; 1425: snap-fitting portion; 144: clamping portion; 146: cover; 148: handle; 2: container; 21: outlet; 22: annular wall.

DETAILED DESCRIPTION OF EMBODIMENTS

The technical solutions of the embodiments of the present disclosure will be described clearly and completely below with reference to the accompanying drawings of the embodiments. Obviously, the described embodiments are part of the embodiments of the present disclosure, not all of them. The following description of at least one exemplary embodiment is actually only illustrative and in no way constitutes any limitation on the present disclosure and its application or use. Based on the embodiments in the present disclosure, all other embodiments obtained by those skilled in the art without engaging in inventive effort fall within the protection scope of the present disclosure.

Mentioning "embodiments" in this document means that the specific features, structures, or characteristics described in conjunction with the embodiments may be included in at least one embodiment of the present disclosure. The occurrence of this phrase in various places in the specification does not necessarily refer to the same embodiment, nor is it an independent or alternative embodiment exclusive of other embodiments. It is explicitly and implicitly understood by those skilled in the art that the embodiments described herein can be combined with other embodiments.

Figure 2:
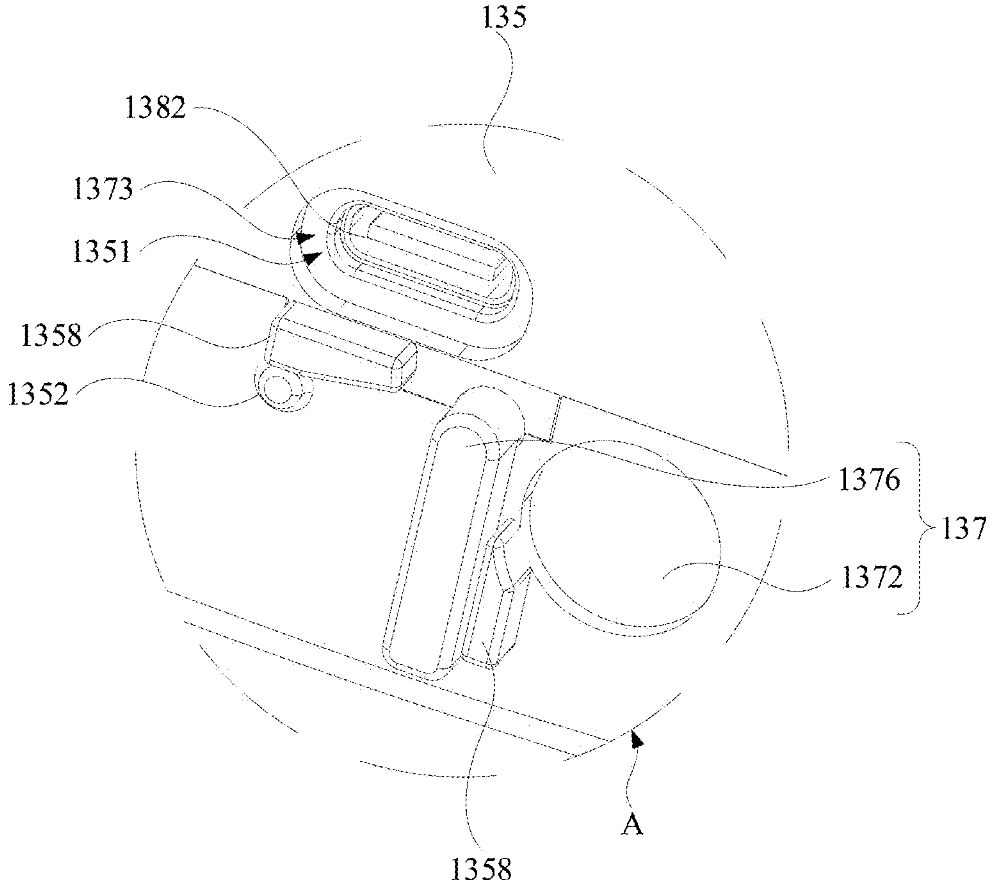
FIG. 2 is an enlarged schematic view of portion A of the liquid pumping device shown in FIG. 1.
Figure 3:
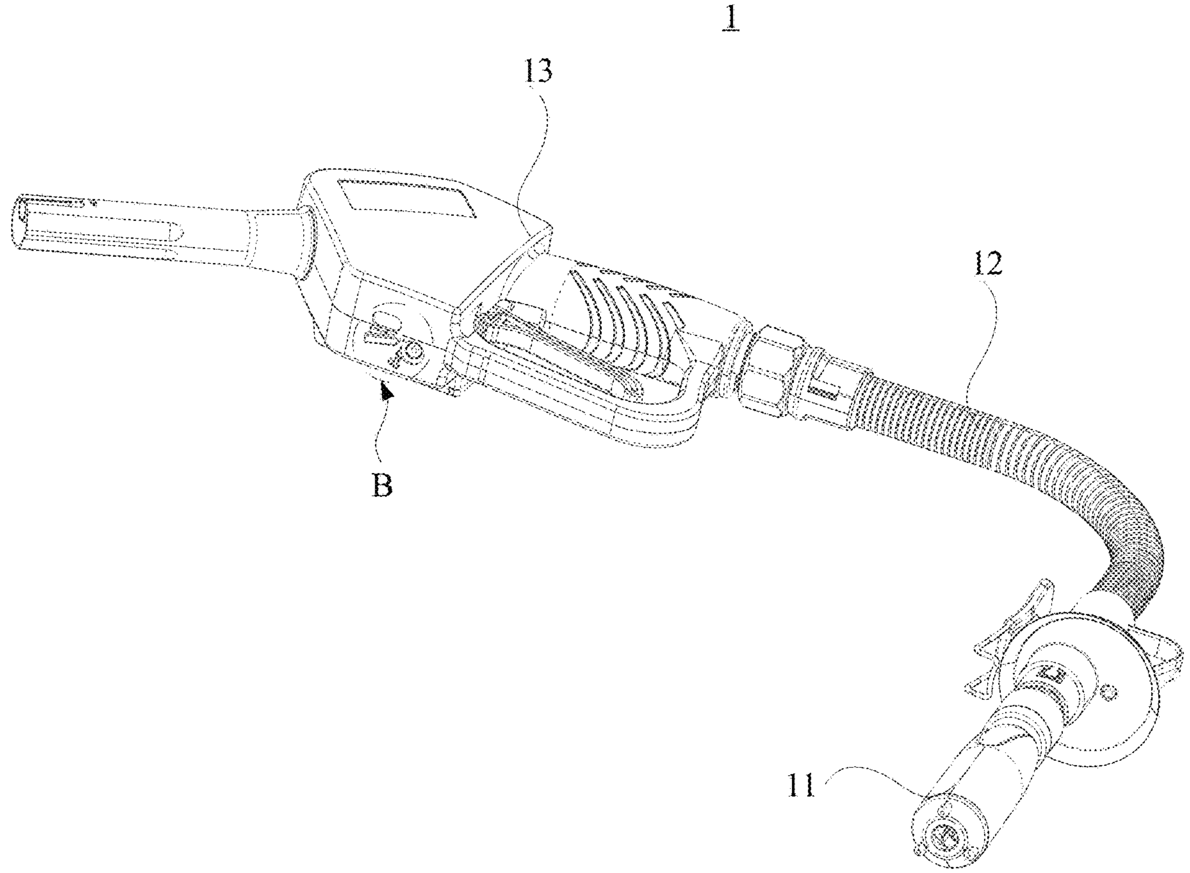
FIG. 3 is a schematic structural view of the liquid pumping device shown in FIG. 1 in another state.
Figure 4:
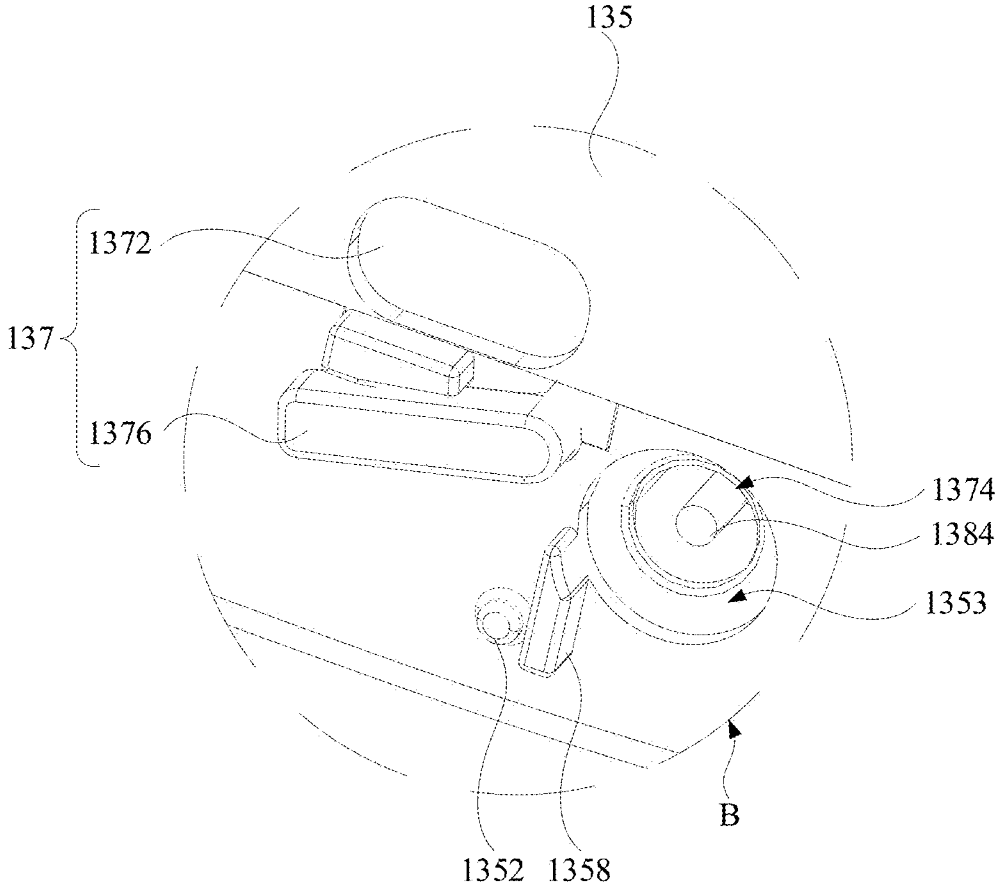
FIG. 4 is an enlarged schematic view of portion B of the liquid pumping device shown in FIG. 3.

Please refer to FIG. 1 and FIG. 2. FIG. 1 is a schematic structural diagram of a liquid pumping device provided by the embodiments of the present disclosure, FIG. 2 is an enlarged schematic view of portion A of the liquid pumping device shown in FIG. 1, FIG. 3 is a schematic structural view of the liquid pumping device shown in FIG. 1 in another state, and FIG. 4 is an enlarged schematic view of portion B of the liquid pumping device shown in FIG. 3. An embodiment of the present disclosure provide a liquid pumping device 1, which includes a pump body 11, a pipe 12, and a grip portion 13. The pump body 11 is configured to be disposed within a container 2 to pump liquid from the container 2. The pipe 12 is connected to the pump body 11 to transport the liquid. The grip portion 13 is connected to a distal end of the pipe 12 away from the pump body 11. The grip portion 13 is connected to the pump body 11 and is capable of controlling the pump body 11, such as starting or stopping the pump body 11. The grip portion 13 includes a swing plate 137 and a plurality of power supply interfaces, wherein the plurality of power supply interfaces at least include a first power supply interface 1382 and a second power supply interface 1384 of different types. The swing plate 137 is movable. When the swing plate 137 moves to a first position, the swing plate 137 exposes the first power supply interface 1382 and covers the second power supply interface 1384. When the swing plate 137 moves to a second position, the swing plate 137 exposes the second power supply interface 1384 and covers the first power supply interface 1382.

In the embodiments of the present disclosure, the pump body 11 performs liquid pumping, while the pipe 12 serves as a liquid-transporting pipeline to guide the pumped liquid from the pump body 11 outside the container 2. The grip portion 13, connected to the distal end of the pipe 12, not only provides a convenient holding point for the user but also enables direct or indirect control of the pump body's operational status through functional interaction with the pump body 11, such as starting or stopping the pump body 11, thereby enhancing operational convenience.

The grip portion 13 is provided with a plurality of power supply interfaces, and the power supply interfaces at least include the first power supply interface 1382 and the second power supply interface 1384 of different types. For example, the first power supply interface 1382 may be a Type-C interface, and the second power supply interface 1384 may be a DC interface, configured to accommodate diverse external power sources so as to satisfy power supply requirements in different scenarios.

The grip portion 13 is further equipped with the movable swing plate 137, which, through its moving mechanism, can selectively expose or cover the power supply interfaces. When the swing plate 137 is in a first position, the first power supply interface 1382 is in an exposed and usable state, while the second power supply interface 1384 is covered by the swing plate 137; at this time, the user can power the device via the first power supply interface 1382. When the swing plate 137 is switched to a second position, the second power supply interface 1384 is exposed for use, while the first power supply interface 1382 is covered by the swing plate 137. This design ensures that only one of the first power supply interface 1382 and the second power supply interface 1384 is in an available state at any time, with the other being reliably covered, thereby guiding the user to correctly use the currently exposed and usable power supply interface.

Therefore, the embodiments of the present disclosure ensures, through the mechanism of the swing plate 137 selectively exposing the power supply interfaces, that the first power supply interface 1382 and the second power supply interface 1384 are not used simultaneously. This effectively prevents misinsertion operations that might otherwise occur due to multiple power supply interfaces being exposed at the same time, and fundamentally avoids circuit conflicts or equipment damage caused by the simultaneous connection of different types of power sources. For example, when a user chooses to power the device using the Type-C interface, the swing plate 137 automatically covers the DC interface, thereby preventing misinsertion and also protecting the unused power supply interface from external contamination such as dust and liquids, which helps extend the service life of the power supply interfaces. Moreover, when supplying power to the liquid pumping device 1, the user does not need to distinguish or select among multiple power supply interfaces. Instead, by simply connecting to the power supply interface exposed by the swing plate 137, the user can quickly and intuitively use the power supply interface. This approach not only achieves diversification of the power supply interfaces but also enhances the safety and reliability of the liquid pumping device 1 during power supply.

It is understood that the grip portion 13 may further include additional power supply interfaces, and the swing plate 137 may be rotated to a corresponding position to expose one of the power supply interfaces and cover the other power supply interfaces. For example, the grip portion 13 further includes a third power supply interface, and the swing plate 137 may also be rotated to a corresponding position to expose the third power supply interface and cover the first power supply interface 1382 and the second power supply interface 1384. Correspondingly, when the swing plate 137 is rotated to the first position or the second position, the swing plate 137 also covers the third power supply interface.

Figure 5:
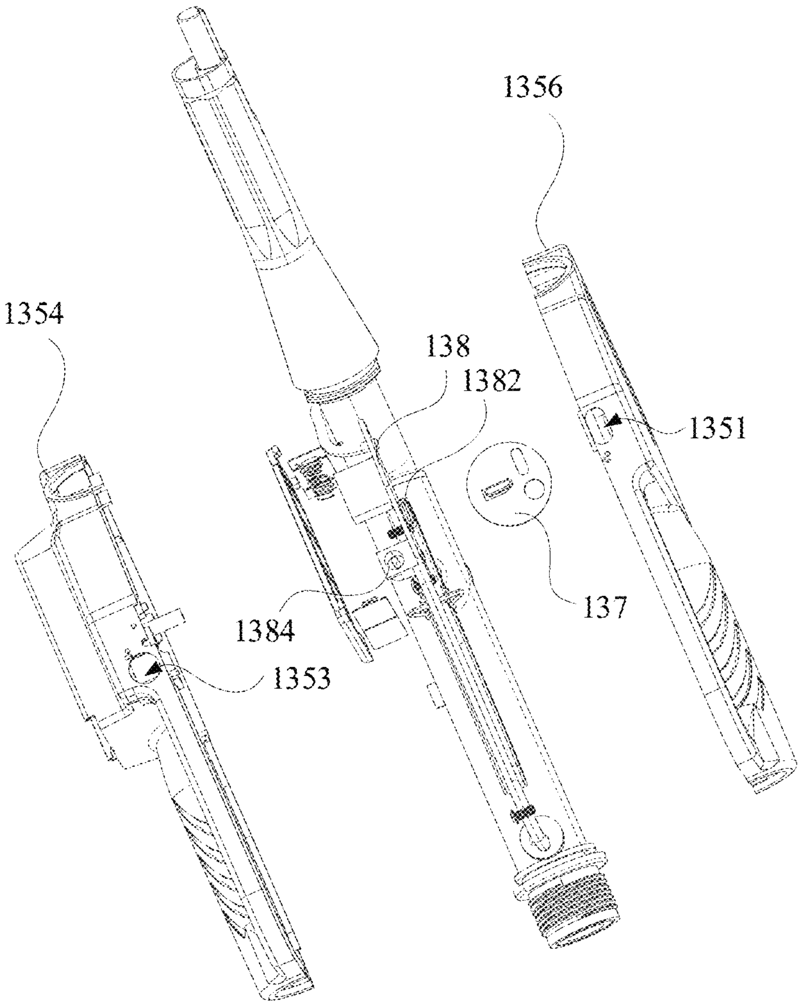
FIG. 5 is an exploded view of the liquid pumping device shown in FIG. 1.

With reference to FIG. 5, FIG. 5 is an exploded view of the liquid pumping device shown in FIG. 1. In some embodiments, the grip portion 13 further includes a base 135 and a circuit board 138, the circuit board 138 being disposed within the base 135, the circuit board 138 having the first power supply interface 1382 and the second power supply interface 1384, the base 135 being provided with a first opening 1351 and a second opening 1353, the first opening 1351 being aligned with the first power supply interface 1382, the second opening 1353 being aligned with the second power supply interface 1384. The swing plate 137 is rotatably coupled to the base 135, the swing plate 137 being configured to cover at least one of the first opening 1351 and the second opening 1353, and expose either the first opening 1351 or the second opening 1353.

In this embodiment, to enable the user to access the first power supply interface 1382 and the second power supply interface 1384, the base 135 is correspondingly provided with a first opening 1351 and a second opening 1353, forming a passage for power cord insertion. The swing plate 137 is rotatably mounted on the base 135 via a rotary connection, ensuring simple operation and a structurally stable and reliable configuration. The user can rotate the swing plate 137 to a first position, thereby exposing the first opening 1351 while covering the second opening 1353; alternatively, the swing plate 137 can be rotated to a second position, thereby exposing the second opening 1353 while covering the first opening 1351.

Figure 6:
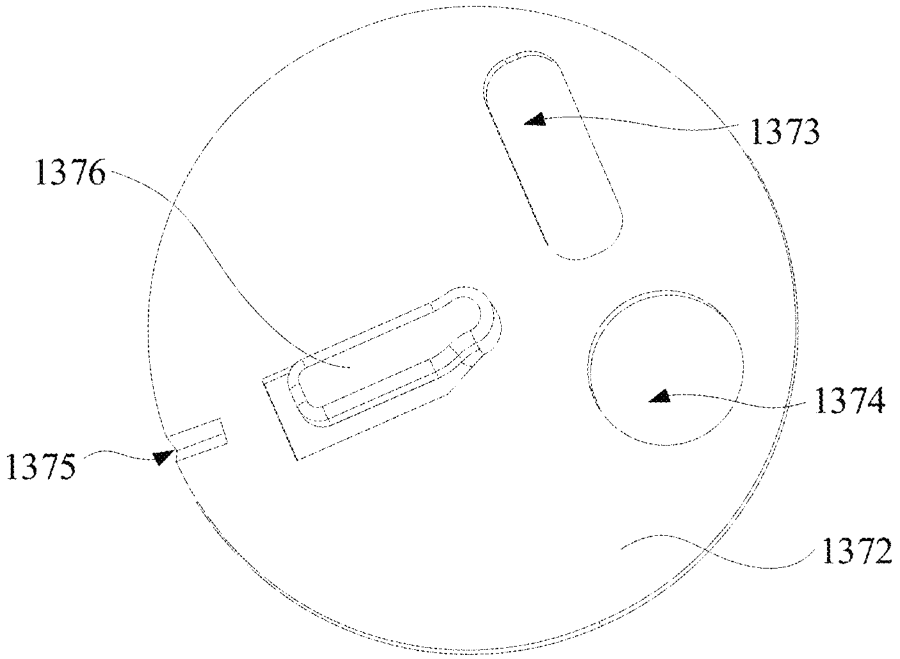
FIG. 6 is a schematic structural view of the swing plate of the liquid pumping device shown in FIG. 5.

With reference to FIG. 6, FIG. 6 is a schematic structural view of the swing plate of the liquid pumping device shown in FIG. 5. In some embodiments, the swing plate 137 includes a plate body 1372 and an actuating portion 1376, wherein the plate body 1372 is disposed within the base 135, and the actuating portion 1376 is disposed outside the base 135. The actuating portion 1376 is configured to drive rotation of the plate body 1372. The plate body 1372 is provided with a third opening 1373 and a fourth opening 1374. When the third opening 1373 is aligned with the first opening 1351, the first power supply interface 1382 is exposed. When the fourth opening 1374 is aligned with the second opening 1353, the second power supply interface 1384 is exposed.

In this embodiment, the user can rotate the plate body 1372 disposed within the base 135 by actuating the actuating portion 1376 located outside the base 135. When the plate body 1372 is rotated such that its third opening 1373 is aligned with the first opening 1351 on the base 135, the two openings form a continuous passage that fully exposes the first power supply interface 1382 for user connection to a power source. Correspondingly, when the plate body 1372 is rotated to align its fourth opening 1374 with the second opening 1353 on the base 135, the second power supply interface 1384 is exposed and placed in an operable state. When the plate body 1372 is rotated to a position where none of its openings are aligned with any openings on the base 135, the solid structure of the plate body 1372 completely shields all power supply interfaces.

Through the above structure, the user only needs to actuate the actuating portion 1376 located outside the base 135, and can switch to expose different power supply interfaces or shield corresponding power supply interfaces by utilizing the alignment relationship between the openings of the plate body 1372 and the openings of the base 135. This not only provides an intuitive and convenient operation process, but also achieves centralized management of multiple power supply interfaces, thereby ensuring that at any given time, no more than one power supply interface is in a connectable state. On one hand, this effectively avoids the risk of circuit conflicts caused by misinsertion or simultaneous connection of multiple power sources. On the other hand, it also provides effective physical protection for non-active power supply interfaces, enhancing the operational safety, reliability, and durability of the device.

Figure 7:
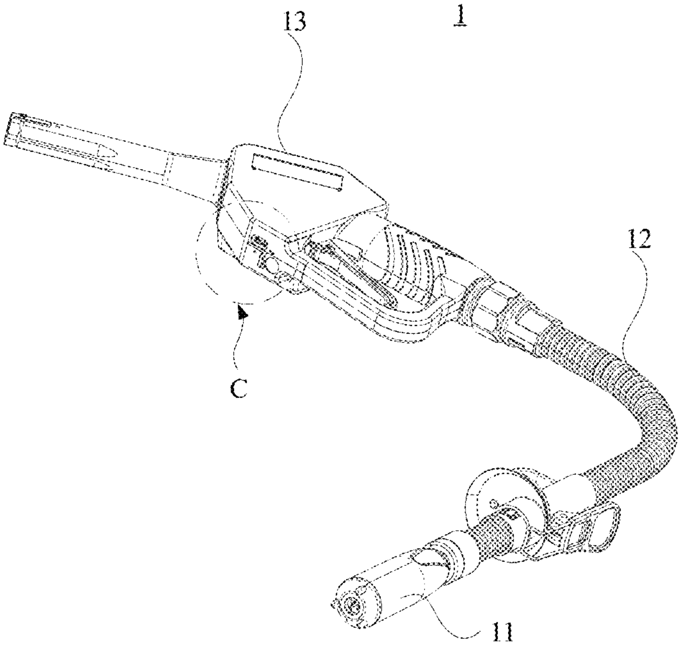
FIG. 7 is another schematic structural view of the liquid pumping device provided in the embodiment of the present disclosure.
Figure 8:
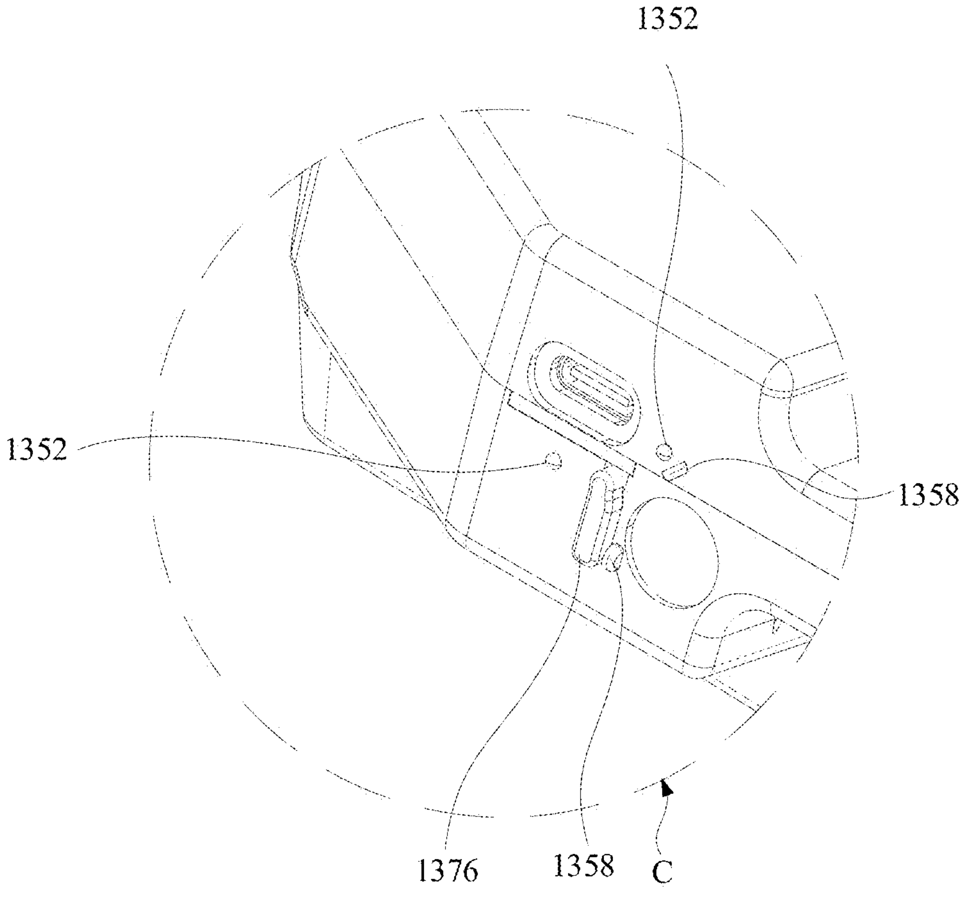
FIG. 8 is an enlarged schematic view of portion C of the liquid pumping device shown in FIG. 7.

With reference to FIG. 7 and FIG. 8, FIG. 7 is another schematic structural view of the liquid pumping device provided in the embodiments of the present disclosure, and FIG. 8 is an enlarged schematic view of portion C of the liquid pumping device shown in FIG. 7. In some embodiments, when the swing plate 137 is rotated to a third position, the swing plate 137 covers the first power supply interface 1382 and the second power supply interface 1384.

In this embodiment, in addition to being rotatable to positions for respectively exposing the first power supply interface 1382 or the second power supply interface 1384, the swing plate 137 can also be rotated to a third position. When in this third position, the swing plate 137 simultaneously covers both the first power supply interface 1382 and the second power supply interface 1384, placing both power supply interfaces in a shielded and unusable state. When the liquid pumping device 1 is temporarily not in use or requires storage or transportation, the user can position the swing plate 137 in this third position, thereby providing concurrent protection for both the first power supply interface 1382 and the second power supply interface 1384. This effectively prevents the ingress of dust, moisture, or other foreign matter into the interior of the power supply interfaces, which could otherwise lead to corrosion or short circuits. As a result, the maintenance convenience and long-term reliability of the device are enhanced.

It should be noted that the moving mechanism of the swing plate 137 is not limited to a rotary connection. The swing plate 137 may also be arranged on the grip portion 13 through linear sliding. Through such linear sliding, the swing plate 137 can similarly be positioned at different locations to achieve the functions of covering and exposing the power supply interfaces.

In some embodiments, the base 135 is provided with a first limiting portion, and the actuating portion 1376 is provided with a second limiting portion. The first limiting portion and the second limiting portion are limitingly engageable with each other to limit the swing plate 137 to at least one of the first position, the second position, and the third position.

Figure 9:
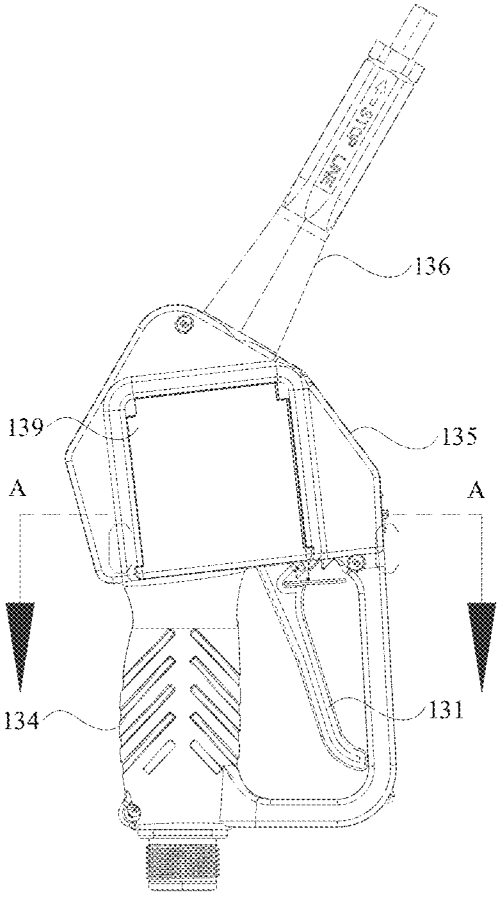
FIG. 9 is a schematic structural view of the liquid pumping device shown in FIG. 1 from another angle.
Figure 10:
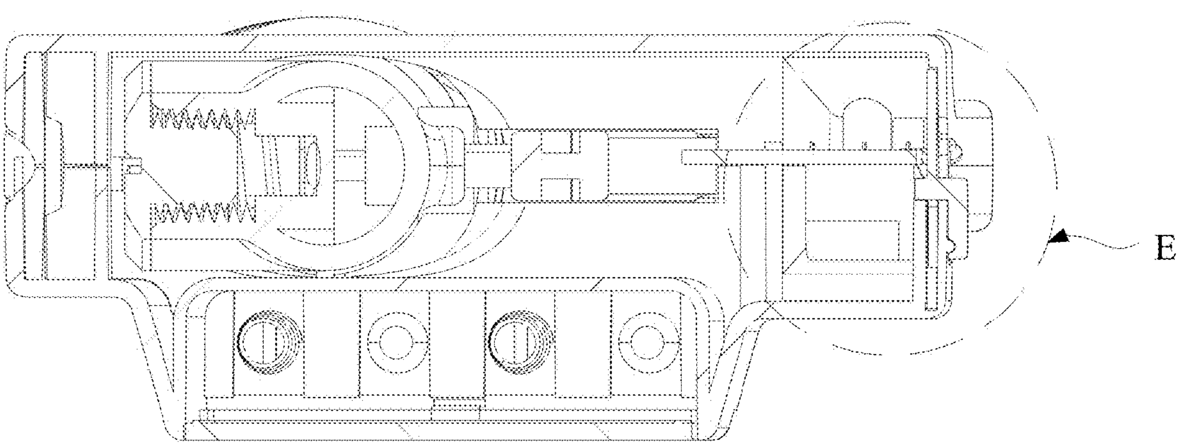
FIG. 10 is a cross-sectional view of the liquid pumping device shown in FIG. 9 along the AA direction.
Figure 11:
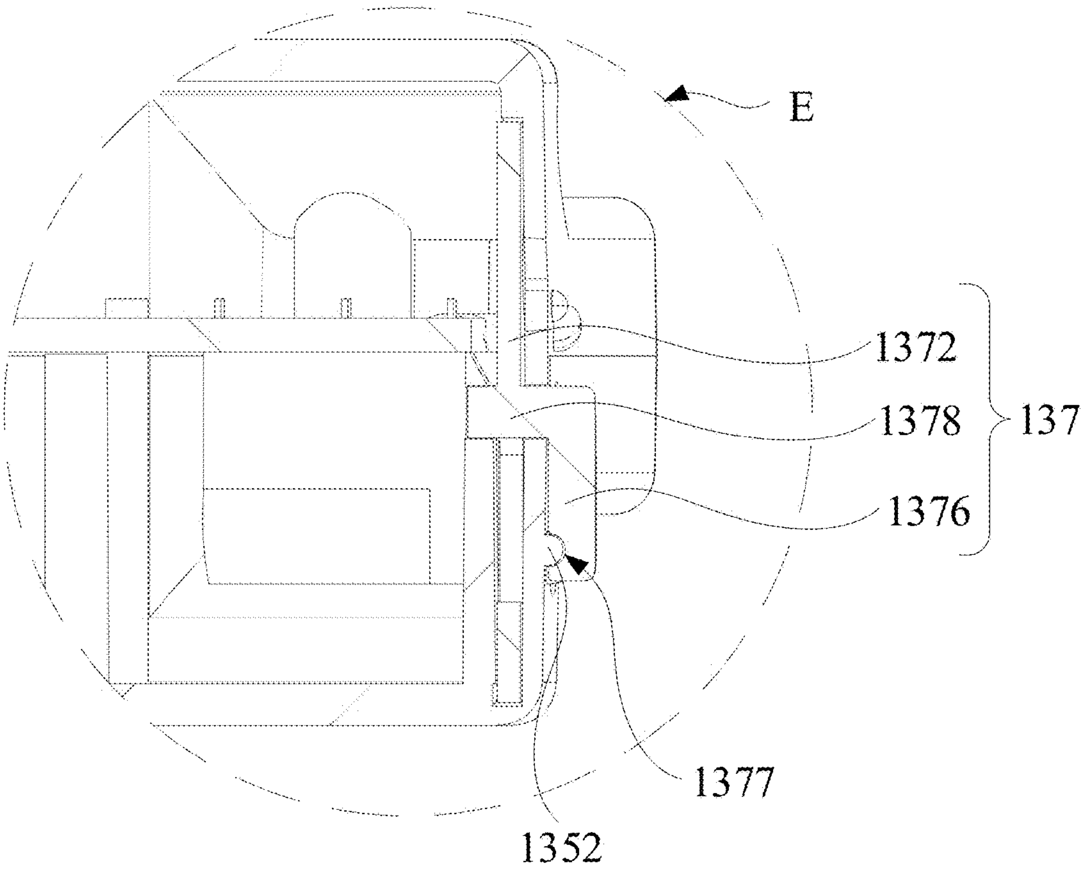
FIG. 11 is an enlarged schematic view of portion E of the liquid pumping device shown in FIG. 10.

With reference to FIGS. 9-11, FIG. 9 is a schematic structural view of the liquid pumping device shown in FIG. 1 from another angle, FIG. 10 is a cross-sectional view of the liquid pumping device shown in FIG. 9 along the AA direction, and FIG. 11 is an enlarged schematic view of portion E of the liquid pumping device shown in FIG. 10.

In some examples, the first limiting portion includes a plurality of limiting protrusions 1352, and the second limiting portion includes a mating recess 1377. The plurality of limiting protrusions 1352 are spaced apart and disposed on the base 135. During rotation of the swing plate 137 relative to the base 135, the mating recess 1377 can engage with any one of the limiting protrusions 1352 to position the swing plate 137 at the first position, the second position, or the third position.

Wherein, the limiting protrusion 1352 may be a hemispherical or wedge-shaped structure, and the shape of the mating recess 1377 is complementary thereto, such that the two can form a stable yet releasable snap-fit connection. During rotation of the actuating portion 1376 by the user, the actuating portion 1376 drives the internal plate body 1372 to rotate synchronously. In this process, the mating recess 1377 on the actuating portion 1376 can sequentially engage with the limiting protrusions 1352 at different positions on the base 135, thereby switching and locking the swing plate 137 between different working positions.

In some examples, the plurality of limiting protrusions 1352 may include a first limiting protrusion, a second limiting protrusion, and a third limiting protrusion. Along the rotation direction of the swing plate 137, the second limiting protrusion is located between the first limiting protrusion and the third limiting protrusion. When the mating recess 1377 engages with the first limiting protrusion, the swing plate 137 is in the first position. When the mating recess 1377 engages with the second limiting protrusion, the swing plate 137 is in the second position. When the mating recess 1377 engages with the third limiting protrusion, the swing plate 137 is in the third position.

Once the mating recess 1377 forms a snap-fit with any one of the limiting protrusions 1352, the user can apply a certain rotational external force to overcome the snap-fit. When sufficient torque is applied, the mating recess 1377 can smoothly slide out of the current limiting protrusion 1352 and continue rotating to the next working position to expose the desired power supply interface. This ensures both the stability of the swing plate 137 in its working positions, preventing accidental displacement due to slight contact, and the ability to achieve smooth positional transitions when switching power supply interfaces through appropriate external force, thereby balancing the stability and flexibility of the swing plate 137.

Additionally, the engagement mechanism between the mating recess 1377 and the limiting protrusions 1352 in this embodiment also provides users with a clear detent feel and distinct tactile feedback, making the positional switching process accurate and reliable. At the same time, it ensures that the swing plate 137 can stably remain in the limiting positions, effectively preventing power interruption or unintended exposure of the interface due to accidental sliding, thereby safeguarding the continuity and safety of the power supply process.

It should be noted that the number of limiting protrusions 1352 can be adjusted according to actual needs. In another example, only two limiting protrusions 1352 may be provided, allowing the swing plate 137 to switch and lock between two positions. Alternatively, only one limiting protrusion 1352 may be provided, in which case the swing plate 137 can achieve stable limiting at a single position.

In some embodiments, the limiting connection between the base 135 and the actuating portion 1376 can also be achieved through other structural forms. For example, a magnetic snap-fit connection can be employed: multiple first magnetic elements can be provided at positions on the base 135 corresponding to the working positions of the swing plate 137. These first magnetic elements can be embedded in recesses in the base 135, directly adhered and fixed, or integrally formed with the base 135 via an injection molding process. Correspondingly, second magnetic elements are provided at matching positions on the actuating portion 1376. When the actuating portion 1376 rotates to each working position, the magnetic attraction between the corresponding first magnetic elements on the base 135 and the second magnetic elements on the actuating portion 1376 achieves a stable limiting effect. When switching positions, the external force applied by the user overcomes the magnetic force, allowing continued rotation to the next position. One of the first magnetic elements and the second magnetic elements is a magnet, and the other is a magnet or a magnetic metal.

In other embodiments, the limiting structure can also adopt a configuration of an elastic protrusion and a limiting hole. Specifically, the first limiting portion can be configured as a plurality of limiting holes, and the second limiting portion can be configured as an elastic protrusion. During rotation of the actuating portion 1376, the elastic protrusion elastically retracts upon contacting the surface of the base 135. When rotated to a working position, the elastic protrusion aligns with a limiting hole and extends under its own elasticity to snap into the hole, thereby achieving reliable limiting. When switching positions, the external force applied by the user causes the elastic protrusion to retract again, allowing continued rotation to the next position.

In one embodiment, the swing plate 137 further includes a rotation shaft 1378, with both the plate body 1372 and the actuating portion 1376 connected to the rotation shaft 1378. The actuating portion 1376 and the plate body 1372 are located on opposite sides of the base 135. The actuating portion 1376 includes opposing first and second ends. The first end is connected to the rotation shaft 1378. A side of the second end facing toward the base 135, is provided with the mating recess 1377. A plurality of limiting protrusions 1352 protruding from an outer side of the base 135.

This embodiment achieves linkage transmission between the actuating portion 1376 and the internal plate body 1372 via the rotation shaft 1378, ensuring that external operation of the actuating portion 1376 is precisely transmitted to the internal plate body 1372. The actuating portion 1376 can be a strip-like structure. The elongated design of the strip-like actuating portion 1376 forms an effective lever arm during operation, allowing the user to effortlessly drive rotation of the plate body 1372 with minimal force, thereby enhancing operational convenience. Additionally, positioning the mating recess 1377 at the second end, away from the rotation shaft 1378, effectively increases the lever arm for the limiting function, making the snap-fit between the limiting protrusions 1352 and the mating recess 1377 more stable and reliable, and significantly enhancing the holding force of the swing plate 137 at each working position. The limiting protrusions 1352 are located on the outer side of the base 135, allowing users to easily view their positions and conveniently control the rotation angle and force of the actuating portion 1376.

Figure 12:
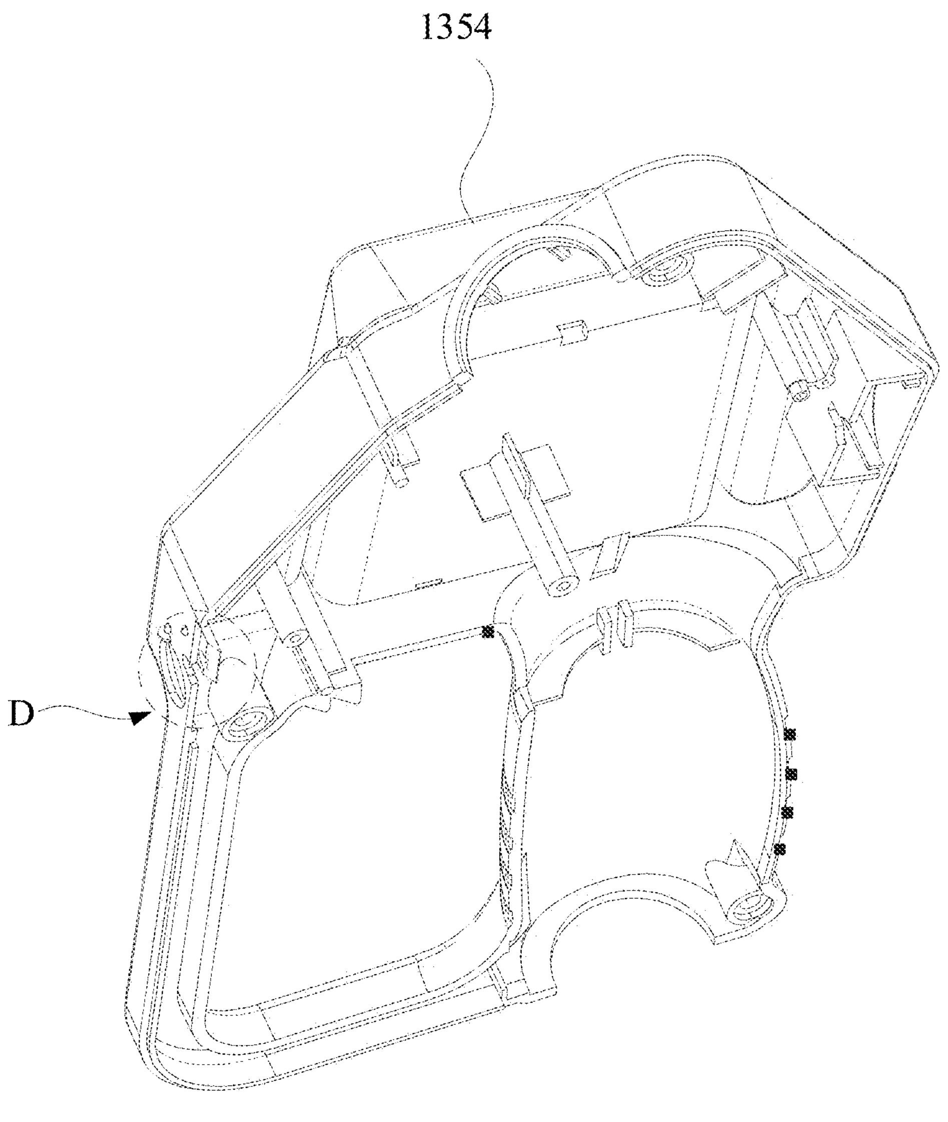
FIG. 12 is a schematic structural view of the first sub-shell of the liquid pumping device shown in FIG. 5.
Figure 13:
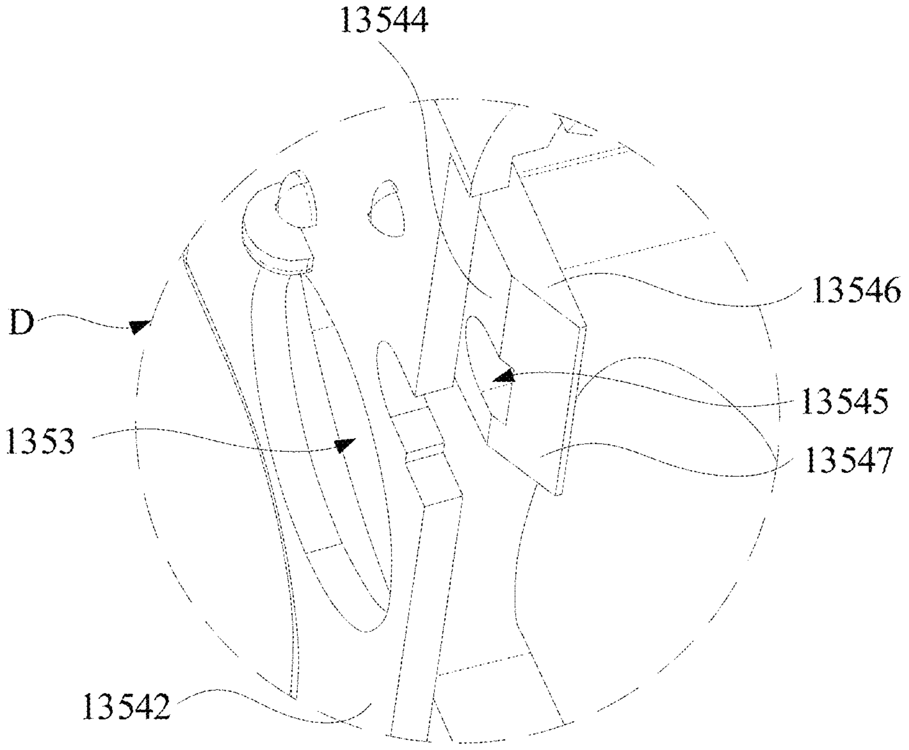
FIG. 13 is an enlarged schematic view of portion D of the first sub-shell shown in FIG. 12.

In some embodiments, the base 135 includes a first sub-shell 1354 and a second sub-shell 1356 configured in a split configuration. The first sub-shell 1354 and a second sub-shell 1356 are assembled together to form the base 135. With reference to FIGS. 12 and 13, FIG. 12 is a schematic structural view of the first sub-shell of the liquid pumping device shown in FIG. 5, and FIG. 13 is an enlarged schematic view of portion D of the first sub-shell shown in FIG. 12. The first sub-shell 1354 includes an outer plate 13542 and a bracket 13544. The outer plate 13542 is located at the outermost side of the first sub-shell 1354, and the bracket 13544 is located inside the first sub-shell 1354 and opposite to the outer plate 13542. The bracket 13544 is provided with a rotation hole 13545 on the side facing the outer plate 13542. The rotation shaft 1378 passing through the outer plate 13542, with a portion of the rotation shaft 1378 located within the rotation hole 13545.

The split design of the first sub-shell 1354 and the second sub-shell 1356 in this embodiment facilitates the installation of components inside the base 135, such as the positioning and fixation of the rotation shaft 1378, the circuit board 138, and other components, effectively improving assembly efficiency. The first sub-shell 1354 also includes the bracket 13544. The rotation shaft 1378 passes through the outer plate 13542, and its end is inserted into the rotation hole 13545 of the bracket 13544. Through this structural design, the rotation shaft 1378 is stably supported between the outer plate 13542 and the bracket 13544, ensuring both the stability of the rotation shaft 1378 installation and the smooth and stable rotation of the swing plate 137. The rotation hole 13545 may be a through-hole penetrating the bracket 13544 or a blind hole, and this embodiment does not impose any limitations.

In some embodiments, the bracket 13544 includes a sidewall 13546 located on a side of the rotation hole 13545 facing toward the second sub-shell 1356, and the sidewall 13546 is provided with a guiding portion to guide the rotation shaft 1378 into the rotation hole 13545. In this embodiment, the guiding portion 13547 is designed to guide the rotation shaft 1378 accurately and smoothly into the rotation hole 13545 during assembly, achieving precise fit between the rotation shaft 1378 and the bracket 13544.

In some embodiments, the guiding portion 13547 includes a sloped surface, which is inclined from the rotation hole 13545 toward the second sub-shell 1356 and away from the outer plate 13542. In this embodiment, the inclined sloped surface forms a guide channel. When an operator moves the end of the rotation shaft 1378 toward the rotation hole 13545, even if there is a certain degree of positional deviation, the end of the rotation shaft 1378 will first contact the inclined surface of the sloped surface. As the pushing continues, the sloped surface will automatically guide the end of the rotation shaft 1378 to the center of the rotation hole 13545, allowing it to smoothly slide into the hole. This guiding process effectively reduces the difficulty of alignment and simplifies the installation operation. The sloped surface design of the guiding portion 13547 also effectively prevents possible jamming or interference between the end of the rotation shaft 1378 and the edges of the bracket 13544, ensuring a smooth installation process and preventing component damage caused by forced installation. At the same time, this guiding mechanism also reduces the required assembly precision, thereby maintaining stable assembly quality and improving product assembly yield.

With continued reference to FIG. 6, in some embodiments, an edge of the plate body 1372 is provided with a positioning groove 1375 facing the outer plate 13542, and the outer plate 13542 is provided with a limiting block protruding toward the positioning groove 1375. The limiting block is capable of snapping into the positioning groove 137 to limit rotation of the plate body 1372. Alternatively, an edge of the plate body 1372 is provided with a positioning groove 1375 facing the bracket 13544, and the bracket 13544 is provided with a limiting block protruding toward the positioning groove 1375. The limiting block is capable of snapping into the positioning groove 1375 to limit rotation of the plate body 1372.

In this embodiment, the positioning structure provides a clear positioning reference for the installation process of the swing plate 137 through the mechanical cooperation of the positioning groove 1375 and the limiting block. During assembly, when the limiting block and the positioning groove 1375 interlock, it indicates to the operator that the plate body 1372 has reached the correct position. This not only simplifies the alignment process during installation, improves assembly precision and efficiency, but also effectively prevents accidental rotation of the plate body 1372 in subsequent assembly steps, creating favorable conditions for the precise installation of other components.

In some embodiments, the positioning groove 1375 has opposing first and second slot walls along the rotation direction of the plate body 1372. The first and second slot walls are inclined and interconnected. The shape of the limiting block is complementary to the positioning groove 1375. When the limiting block is located in the positioning groove 1375, the first and second slot walls can restrict movement of the limiting block along the rotation direction of the plate body 1372.

In this embodiment, when the limiting block is located within the positioning groove 1375, the first and second slot walls can form effective bidirectional constraints, jointly restricting displacement of the limiting block along the rotation direction of the plate body 1372 from two directions. For example, the positioning groove 1375 may adopt a V-shaped structure, and the limiting block is correspondingly designed to be V-shaped to match it. During installation, when the plate body 1372 rotates to a predetermined angle, the self-guiding characteristic of the V-shaped structure allows the limiting block to automatically slide along the inclined first or second slot wall into the bottom of the positioning groove 1375. This process provides the operator with clear tactile feedback, enabling them to accurately perceive when assembly is complete, thereby ensuring assembly precision. The constraints provided by the V-shaped positioning groove 1375 and limiting block are sufficient to maintain the stable position of the plate body 1372, but when switching power supply interfaces, the rotational force applied by the user can also allow the limiting block to more smoothly overcome the constraints of the V-shaped slot walls of the positioning groove 1375, thereby smoothly sliding out of the positioning groove 1375 and adjusting the position of the plate body 1372.

In some embodiments, the base 135 is further provided with two stop portions 1358, which are spaced apart along the rotation direction of the swing plate 137 and located on the rotation trajectory of the swing plate 137 to limit a rotation range of the swing plate 137. The plurality of limiting protrusions 1352 are located between the two stop portions 1358.

In this embodiment, the two stop portions 1358 can mechanically limit the movement of the swing plate 137 from two opposite rotation directions, thereby effectively restricting the rotation range of the swing plate 137. The plurality of limiting protrusions 1352 are located within the area between the two stop portions 1358. Thus, the intermediate plurality of limiting protrusions 1352 provide multiple precise working position locatings for the swing plate 137 through engagement with the mating recess 1377 on the actuating portion 1376. The stop portions 1358 on both sides set safe rotation boundaries for the swing plate 137, effectively preventing mechanical interference, wire entanglement, or component damage caused by excessive rotation.

In some embodiments, the first limiting protrusion is adjacent to one of the stop portions 1358, and the third limiting protrusion is adjacent to the other of the stop portions 1358.

In this embodiment, when the actuating portion 1376 is rotated to the second position, its mating recess 1377 forms a stable engagement with the second limiting protrusion, and the actuating portion 1376 also comes into mechanical contact with the adjacent stop portion 1358. Correspondingly, when the actuating portion 1376 is rotated to the third position, the mating recess 1377 engages with the third limiting protrusion, and the actuating portion 1376 comes into contact with the other stop portion 1358. At the two boundary positions where the actuating portion 1376 can rotate, the actuating portion 1376 not only achieves precise positioning through the engagement of the mating recess 1377 with the second or third limiting protrusion but also gains additional support through direct contact with the stop portion 1358, enhancing the stability of the actuating portion 1376 at the boundary positions and effectively preventing displacement deviations caused by external impacts or long-term use. The stop portions 1358, as boundary stop mechanisms, set clear rotation range boundaries for the swing plate 137, ensuring that the swing plate 137 never exceeds the safe rotation range under any circumstances. The adjacent second or third limiting protrusions provide precise positional locating, and the synergistic effect of the two ensures both the safety of the swing plate 137 rotation and the accuracy of positioning.

In some embodiments, the base 135 is provided with only two limiting protrusions 1352, each adjacent to one of the stop portions 1358. In this embodiment, when the actuating portion 1376 is rotated to the first position, its mating recess 1377 forms a stable engagement with one of the limiting protrusions, and the actuating portion 1376 also comes into mechanical contact with the adjacent stop portion 1358. Correspondingly, when the actuating portion 1376 is rotated to the second position, the mating recess 1377 engages with the other limiting protrusion, and the actuating portion 1376 comes into contact with the other stop portion 1358.

In some embodiments, the first power supply interface 1382 includes one of a USB interface, a Type-C interface, a Micro-USB interface, and a Lightning interface, and the second power supply interface 1384 includes a DC interface.

In this embodiment, the first power supply interface 1382 can be set as a common portable device charging interface type, and the second power supply interface 1384 can be set as a DC interface, thereby accommodating both traditional device power supply and stable power supply in specific scenarios. Such a combination allows the device to adapt to the vast majority of usage environments. Whether powered by a mobile power source, a vehicle power source, or a fixed power source, a corresponding interface can be found for power supply. It should be noted that the types of power supply interfaces mentioned above are merely examples, and other interface types can also be used in actual implementation.

It should also be noted that the grip portion 13 of this embodiment can be further expanded to include additional power supply interfaces or types, such as a third power supply interface. Correspondingly, the structure of the swing plate 137 can be adjusted, for example, by adding corresponding openings and aligning such openings with corresponding openings on the base 135 through rotation or sliding to expose the third power supply interface. Regardless of how the number of power supply interfaces is increased, the movable shielding structure of the swing plate 137 ensures that in any working state, at most only one power supply interface is in an available exposed state, with all other power supply interfaces being reliably covered, fundamentally avoiding the risk of misoperation caused by multiple power supply interfaces being exposed simultaneously.

In some embodiments, the grip portion 13 is also provided with a battery compartment 139, which can accommodate one or more batteries. Alternatively, the grip portion 13 further includes a battery, which may be a non-rechargeable battery or a rechargeable battery.

In this embodiment, the battery can serve as either a replaceable power supply component or a built-in power supply component. The battery can be a dry cell, which is convenient to install and remove from the battery compartment 139. Dry cells are inexpensive and readily available. The battery can also be a rechargeable battery, which can be detachably installed in the battery compartment 139 or built into the base 135 in a non-removable manner. The rechargeable battery can also be charged via the first power supply interface 1382 or the second power supply interface 1384.

In practical use, users can flexibly choose a power supply method based on specific scenarios. For example, the present disclosure constructs at least three complementary power supply modes: dry cell power supply is suitable for work scenarios without external power sources; the Type-C interface can connect to mobile power sources, vehicle USB ports, and other portable power sources; the DC interface can connect to a dedicated adapter to obtain stable electricity. The diversified power supply methods fully consider various practical application scenarios of the liquid pumping device 1 during pumping operations, ensuring that the device can obtain stable power supply in the vast majority of pumping environments and effectively avoiding work interruptions caused by power supply issues.

Figure 14:
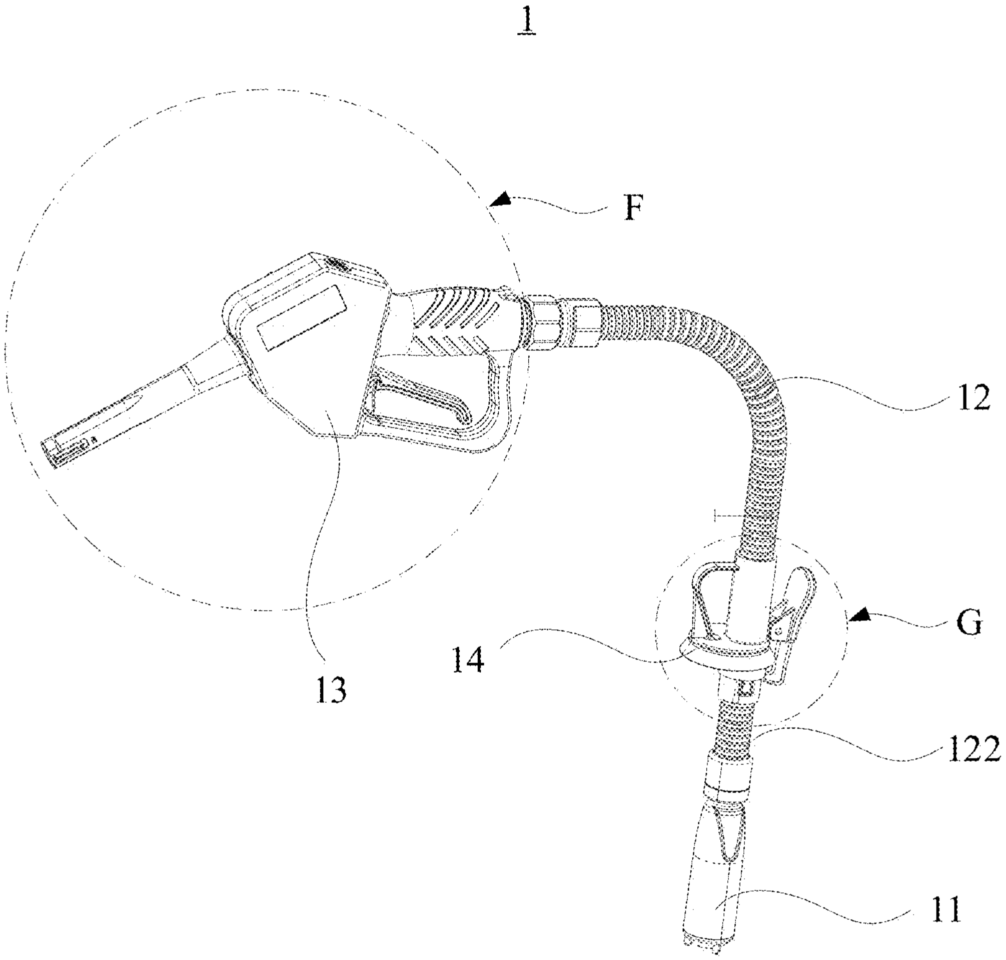
FIG. 14 is a schematic structural view of the liquid pumping device shown in FIG. 1 from yet another angle.
Figure 15:
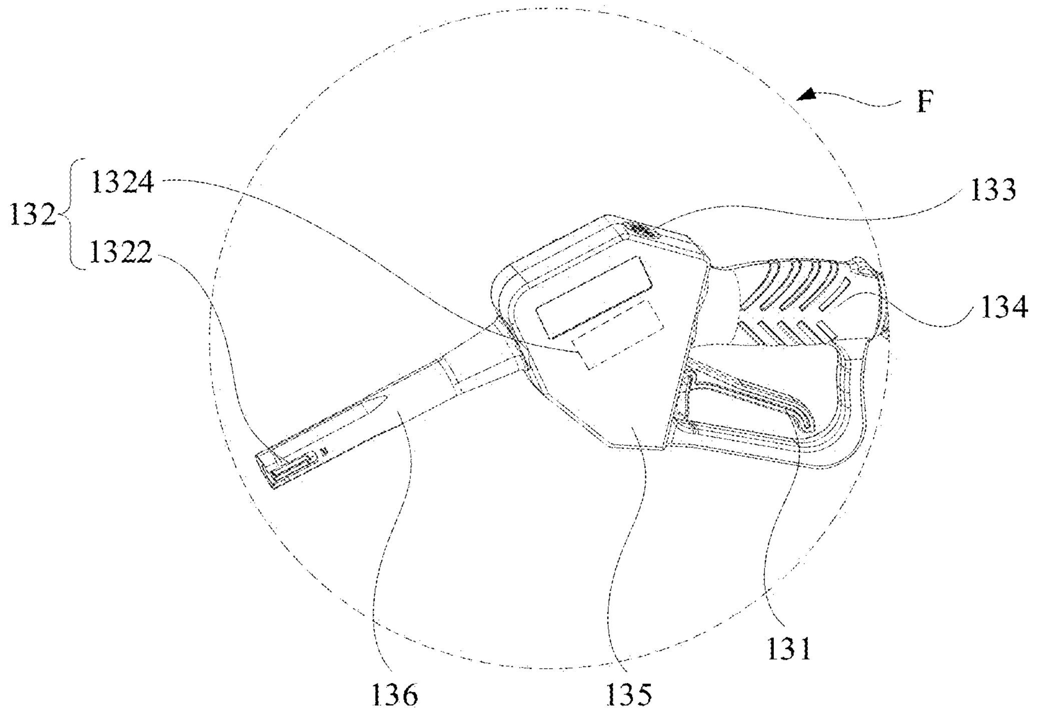
FIG. 15 is a schematic structural view of portion F of the liquid pumping device shown in FIG. 14.

With reference to FIGS. 14 and 15, FIG. 14 is a schematic structural view of the liquid pumping device shown in FIG. 1 from yet another angle, and FIG. 15 is a schematic structural view of portion F of the liquid pumping device shown in FIG. 1. In some embodiments, the grip portion 13 further includes a control switch 133, which is connected to the circuit board 138 and can control the circuit board 1324. The control switch 133 and the first power supply interface 1382 are located on opposite sides of the grip portion 13.

In this embodiment, separating the control switch 133 and the power supply interfaces on opposite sides of the grip portion 13 provides a certain spatial separation, ensuring that users do not accidentally trigger the switch when plugging or unplugging the power supply. At the same time, operating the switch does not interfere with the power supply connection, making it suitable for use in scenarios requiring cautious operation, such as refueling, and providing users with a safer operational space.

Figure 16:
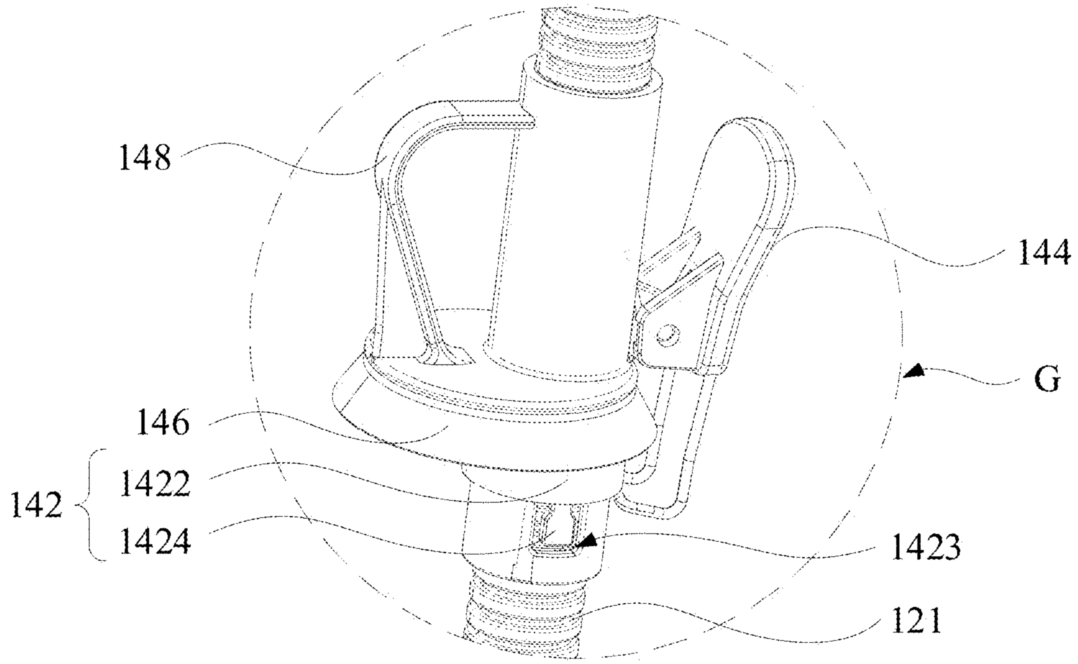
FIG. 16 is an enlarged schematic view of portion G of the liquid pumping device shown in FIG. 14.
Figure 17:
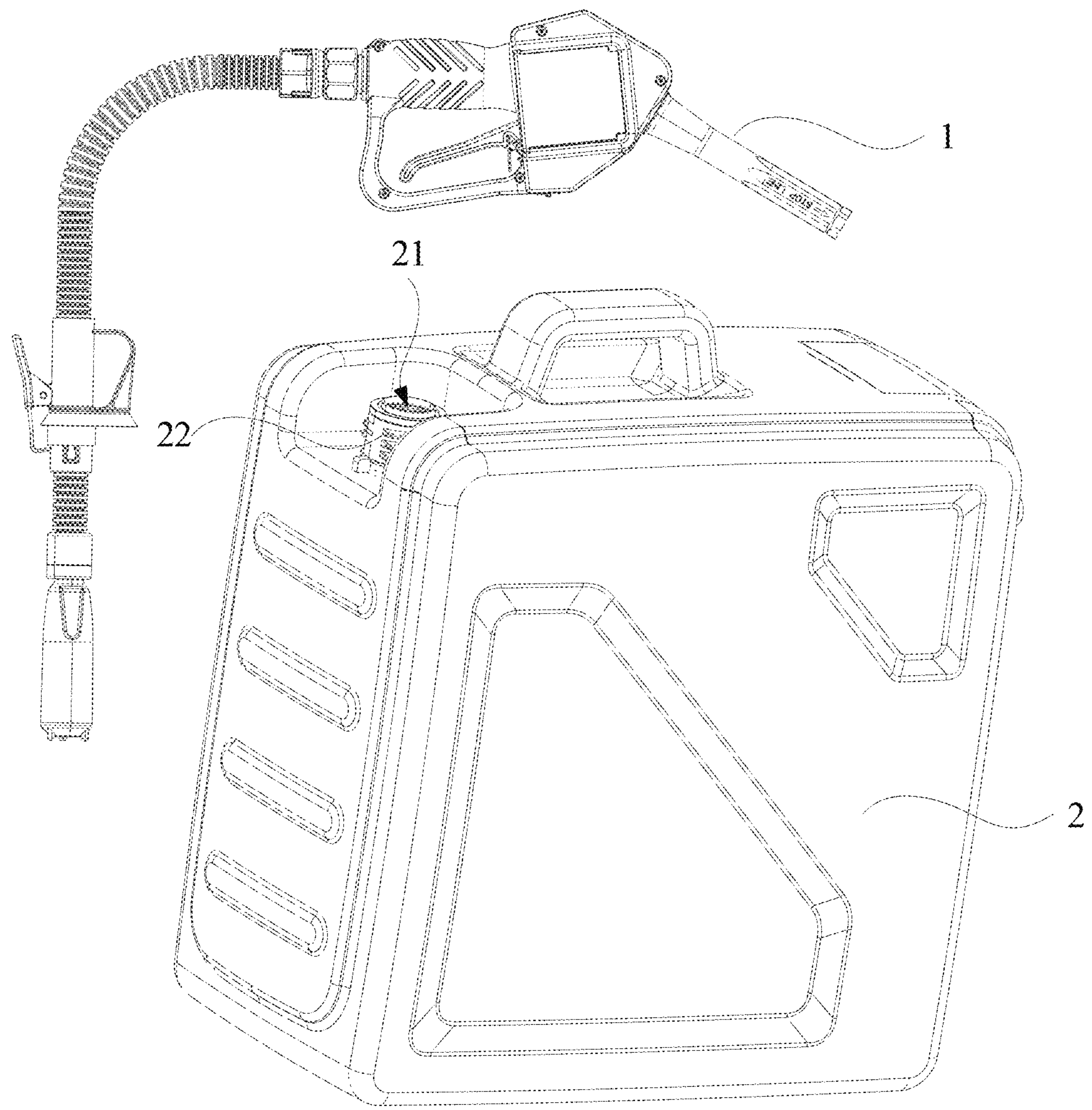
FIG. 17 is a schematic structural view of the liquid filling device provided in the embodiment of the present disclosure.

With reference to FIGS. 16 and 17, FIG. 16 is an enlarged schematic view of portion G of the liquid pumping device shown in FIG. 14, and FIG. 17 is a schematic structural view of the liquid filling device provided in the embodiments of the present disclosure. In some embodiments, the liquid pumping device 1 further includes a mounting portion 14, which is installed on the pipe 12. The mounting portion 14 and the pump body 11 are located at different positions along the pipe 12, and the length of a pipe segment between the mounting portion 14 and the pump body 11 is variable. The mounting portion 14 is configured to be detachably mounted on the container 2.

In the present disclosure, the mounting portion 14 is spaced apart from the pump body 11 along the longitudinal direction of the pipe 12. The pipe segment between the mounting portion 14 and the pump body 11 features a variable effective length. This variable length feature allows users to flexibly adjust the pump body's insertion depth into the container during operation. Regardless of the container's depth, the pump body can be adjusted to reach target positions such as the container bottom, to ensure efficient liquid pumping while avoiding incomplete extraction or air ingress caused by pump body suspension.

Additionally, the mounting portion 14 is detachably mounted on the container 2, such as by clamping or other methods achieving temporary yet rigid fixation. This design introduces an extra stability support point for the liquid pumping device 1. When synergized with the grip portion 13, it effectively prevents the pump body 11 displacement or collision with the container 2 during pumping caused by pipe movement. Furthermore, the detachable mounting mechanism simplifies the assembly/disassembly process. When switching containers 2 or relocating the pumping position, users can quickly detach the liquid pumping device 1 from the current container 2, significantly enhancing usability and operational efficiency.

Therefore, the liquid pumping device 1 provided by the present disclosure achieves flexible adaptation to containers 2 of varying depths through the variable length of the pipe 12 between the mounting portion 14 and the pump body 11, ensuring the pump body 11 remains in an effective working position. Simultaneously, the mounting portion 14 is detachably mounted on the container 2, enabling rapid installation/removal while providing stable support during operation. Combined with the grip portion 13 that directly controls the pump body 11, the entire liquid pumping device 1 offers convenient and efficient operation with enhanced stability.

It should be understood that the container 2 may be a barrel, enclosure, tank, or cassette, etc. The liquid may be configured as needed, such as gasoline, diesel, kerosene, or other solvents. The liquid refilling apparatus can add liquid to fuel tanks of automobiles, motorcycles, yachts, lawn tractors, and similar equipment. For example, the liquid pumping device 1 may function as a gas pump, with the container 2 serving as an oil drum.

In some embodiments, the mounting portion 14 is movably connected to the pipe 12, and the mounting portion 14 is capable of being relatively moved along the pipe 12 to be positioned at different locations of the pipe 12.

In these embodiments, by configuring the mounting portion 14 and the pipe 12 as movably connected, the mounting portion 14 can be moved along the longitudinal direction of the pipe 12 and be fixed at different positions, thereby achieving flexible adjustment of the pipe segment's length between the mounting portion 14 and the pump body 11. Exemplarily, the mounting portion 14 is sleeved around the outer periphery of the pipe 12, and an inner wall of the mounting portion 14 forms a sliding fit structure with an outer wall of the pipe 12. To ensure operational stability, the mounting portion 14 may be provided with a locking/unlocking mechanism. When adjustment is required, the user operates the locking/unlocking mechanism to unlock the mounting portion 14, allowing it to slide axially along the pipe 12 to a target position, such as positioning the pump body 11 to precisely reach the bottom of the current container 2. After reaching the target position, operating the locking/unlocking mechanism again secures the mounting portion 14 firmly to the pipe 12.

Therefore, when the mounting portion 14 is in the unlocked state, it can freely slide relative to the pipe 12 for rapid positioning; when locked, the relative position between the mounting portion 14 and the pipe 12 is fixed, thereby ensuring stability during liquid pumping operations. Through these simple sliding, unlocking, and locking operations, users can precisely and rapidly adjust the working depth of the pump body 11 within the container 2 without tools, enabling the liquid pumping device 1 to accommodate containers 2 of varying depths from shallow to deep. This not only enhances operational convenience and efficiency but also effectively prevents performance fluctuations or liquid leakage caused by displacement of the mounting portion 14 during use. The reliable locking mechanism ensures stability and safety throughout the pumping process.

In some embodiments, the mounting portion 14 includes a connecting portion 142 and a clamping portion 144 interconnected with each other. The connecting portion 142 is movably connected to the pipe 12, and the clamping portion 144 clamps the container 2.

In this embodiment, the connecting portion 142 is movably connected to the pipe 12, enabling the entire mounting portion 14 to move relative to the pipe 12 and be fixed at different positions, thereby achieving adjustment of the working depth of the pump body 11. The clamping portion 144 is configured to clamp the container 2. Exemplarily, the clamping portion 144 may adopt a clamp structure that can be opened to accommodate different thicknesses of a rim or edge of the container 2, generating sufficient clamping force when tightened to securely anchor the entire liquid pumping device 1 onto the container 2. This clamping mechanism is independent of specific threads or dimensions of mechanical interfaces of the container 2, thus offering broad applicability. The mounting portion 14 can thus adapt to containers 2 of varying diameters and shapes without requiring specialized fastening fittings for different containers 2, resolving installation challenges caused by inconsistent container 2 port configurations. Therefore, through the synergistic operation of the connecting portion 142 and clamping portion 144 in this embodiment, the mounting portion 14 achieves both ease of adjustment/positioning and provides a stable additional support point for the liquid pumping process, independent of manual handling.

It should be noted that the clamping portion 144 may alternatively be replaced with other structures mounted on the container 2. For example, the clamping portion 144 can be substituted with a suction cup adsorbed onto the surface of the container 2, a magnetic structure adhered to the container 2 (e.g., a magnet is configured on one of the clamping portion 144 and the container 2, and a magnetic component or ferromagnetic material is configured on the other), or a snap-fit structure or other methods capable of achieving detachable active mounting. These methods can all enable the convenient fixation of the mounting portion 14 onto the container 2.

In some embodiments, the clamping portion 144 is configured to clamp an annular wall 22 surrounding an outlet 21 of the container 2.

In this embodiment, the clamping portion 144 does not rely on specific structures of the outlet 21 of the container 2, such as specific threads or protrusions, but instead is securely attached to the annular wall 22 around the outlet 21 of the container 2 solely through its inherent clamping force. This clamping method avoids compatibility issues caused by the varied interface specifications of the container 2. Regardless of the size or shape of the outlet 21 of the container 2, as long as the annular wall 22 can be effectively clamped by the clamping portion 144, a stable and reliable fixation point is provided for the entire liquid pumping device 1. The user does not need to search for or switch any dedicated adapter; instead, simply perforated opening and clamping the clamping portion 144 like a clamp onto the edge of the outlet 21 of the container 2 completes the rapid installation. This method of clamping the annular wall 22 not only ensures the stability of the mounting portion 14, preventing accidental shaking or detachment of the pump body 11 during liquid pumping, but also enables compatibility with the vast majority of common containers 2. Consequently, it enhances the universality and ease of operation of the liquid pumping device 1, thereby improving user experience.

In some embodiments, the connecting portion 142 is sleeved over the pipe 12 and slidable relative to the pipe 12, the connecting portion 142 includes at least one spring tab 1424, and the spring tab 1424 elastically abuts the pipe 12 to form a snap-fit engagement.

Exemplarily, the connecting portion 142 includes a sleeve portion 1422 and the spring tab 1424 configured thereon. Wherein, the sleeve portion 1422 is directly sleeved over the outer periphery of the pipe 12, providing a sliding fit foundation with the pipe 12. The sleeve portion 1422 is provided with a perforated opening 1423, within which the spring tab 1424 is configured. Furthermore, one end of the spring tab 1424 is connected to the main body of the sleeve portion 1422.

Figure 18:
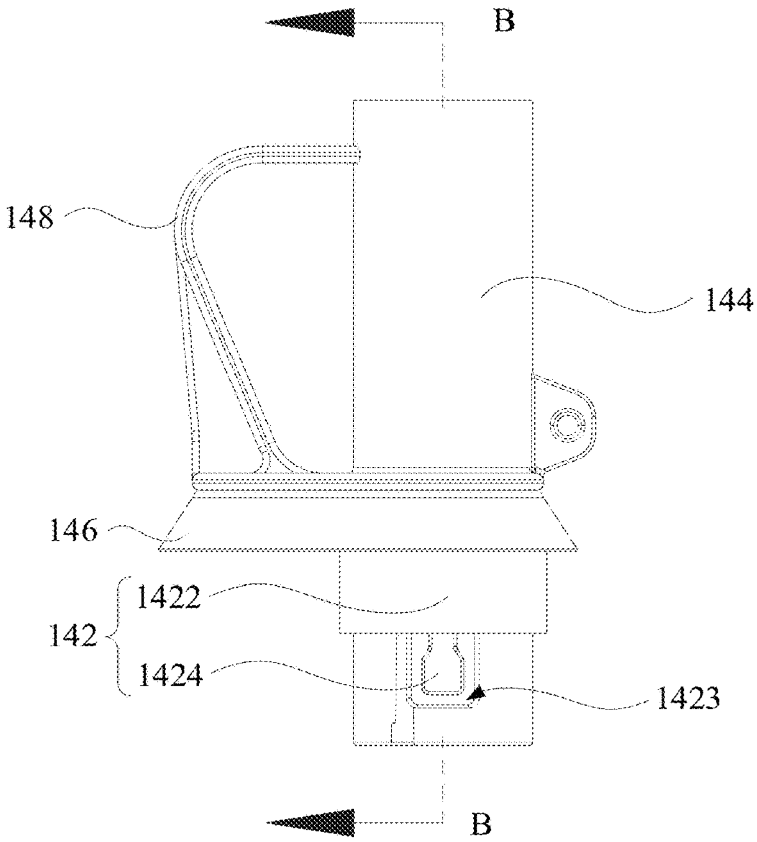
FIG. 18 is a schematic structural view of the mounting portion of the liquid pumping device shown in FIG. 14.
Figure 19:
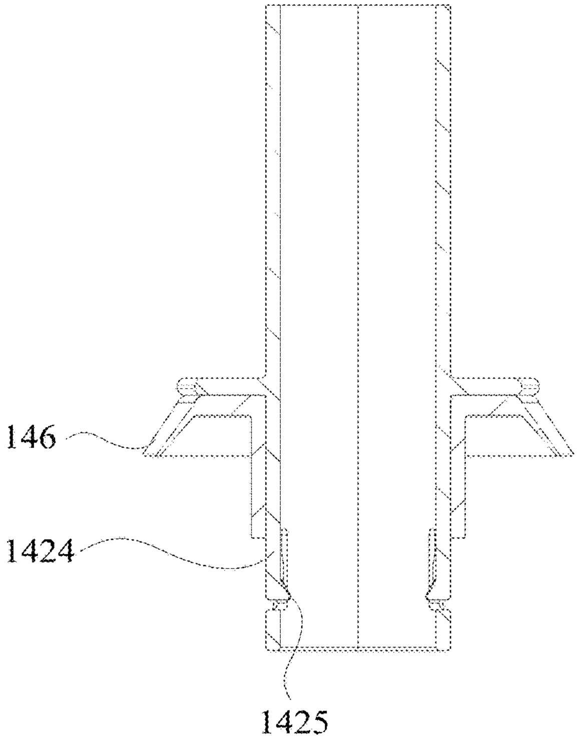
FIG. 19 is a cross-sectional view of the mounting portion shown in FIG. 18 along the BB direction.

Correspondingly, referring to FIG. 18 and FIG. 19, FIG. 18 is a schematic structural diagram of the mounting portion 14 of the liquid pumping device 1 shown in FIG. 14, and FIG. 19 is a cross-sectional view of the mounting portion 14 along the BB direction shown in FIG. 18. The pipe 12 is provided with a plurality of positioning grooves 121 along its longitudinal direction. The other end of the spring tab 1424 is provided with a snap-fitting portion 1425 protruding toward the pipe 12. The snap-fitting portion 1425 is capable of snapping into different positioning grooves 121, thereby positioning the mounting portion 14 at different locations on the pipe 12.

In this embodiment, the sleeve portion 1422 is sleeved over the outer periphery of the pipe 12, forming a sliding fit foundation with the pipe 12. The sleeve portion 1422 is provided with a perforated opening 1423, within which the spring tab 1424 is configured. Since one end of the spring tab 1424 is fixedly connected to the sleeve portion 1422, while the other end is free, the spring tab 1424 is capable of undergoing elastic deformation at the fixed end when subjected to force, thereby enabling switching between a locked state and an unlocked state with respect to the outer wall of the pipe 12.

Specifically, when the mounting portion 14 slides along the pipe 12, the snap-fitting portion 1425 on the spring tab 1424 is capable of sequentially sliding over the positioning grooves 121 on the surface of the pipe 12 under the elastic action of the spring tab 1424. When the mounting portion 14 moves to a target position, the snap-fitting portion 1425, under the restoring force of the spring tab 1424 itself, is precisely snapped into the corresponding positioning groove 121 at that position. By snapping the snap-fitting portion 1425 into different positioning grooves 121, the mounting portion 14 can be stably positioned at different axial locations along the pipe 12, thereby achieving precise and reliable positioning of the mounting portion 14 and effectively preventing slow slippage or accidental displacement during the liquid pumping process.

In an exemplary operational process, a user applies an external force to slide the mounting portion 14 relative to the pipe 12. The spring tab 1424 on the mounting portion 14 deforms to disengage the snap-fitting portion 1425 from the currently engaged positioning groove 121, allowing the mounting portion 14 to slide along the pipe 12. After the external force is removed, the spring tab 1424 utilizes its inherent elastic restoring force to push the snap-fitting portion 1425 into the positioning groove 121 corresponding to the target position. This action achieves a mechanical interlock between the connecting portion 142 and the pipe 12 at the target location, thereby securing the connecting portion 142 firmly in place.

In another exemplary operational process, when a user applies an external force to the spring tab 1424 to induce elastic deformation, the snap-fitting portion 1425 disengages from the currently engaged positioning groove 121. At this point, the connecting portion 142 enters an unlocked state, allowing the user to effortlessly slide the entire mounting portion 14 axially along the pipe 12 until reaching the target position. Once the mounting portion 14 is slid to the target position (e.g., positioning the pump body 11 to precisely contact the bottom of the container 2), the user simply removes the external force from the spring tab 1424. The spring tab 1424, leveraging its inherent elastic restoring force, pushes the snap-fitting portion 1425 into the positioning groove 121 corresponding to the target position. This action establishes a mechanical interlock between the connecting portion 142 and the pipe 12 at the target location, thereby securing the connecting portion 142 firmly in place.

In an exemplary operational process, the sleeve portion 1422 of the connecting portion 142 and the spring tab 1424 may be manufactured as an integral component, for example, through an injection molding process to integrally form the parts. This approach simplifies the manufacturing workflow, reduces the number of components, and lowers assembly complexity and costs. Simultaneously, the design of the perforated opening 1423 ensures that the spring tab 1424 retains sufficient operational space and elastic travel while avoiding structural instability or wear issues caused by additional supplementary parts, thereby enhancing durability. Furthermore, the sleeve portion 1422 and spring tab 1424 may also be processed separately, and this embodiment does not impose restrictions on this aspect.

In some embodiments, the mounting portion 14 further includes a flexible cover 146 connected to the connecting portion 142, the flexible cover 146 surrounds the connecting portion 142 and is configured to enclose the outlet 21 of the container 2.

In this embodiment, the primary function of the flexible cover 146 is to provide effective shielding protection for the outlet 21 of the container 2. When the mounting portion 14 is fixed to the container 2 via its connecting portion 142 and clamping portion 144, the flexible cover 146 can simultaneously cover the outlet 21 of the container 2. This design effectively prevents external contaminants (e.g., dust, debris) from entering the interior of the container 2 through the open outlet 21, thereby maintaining the cleanliness of the liquid inside the container 2 and avoiding potential oil passage blockage or equipment failure caused by impurities. The integration of the flexible cover 146 ensures that the outlet 21 of the container 2 remains protected during the liquid pumping operation of the liquid pumping device 1. This feature is particularly critical for liquid pumping devices 1 used in harsh environments such as outdoor or construction sites, significantly enhancing the safety and hygiene of the liquid pumping device 1 during use.

In some embodiments, the mounting portion 14 further includes a handle 148 connected to the connecting portion 142, the handle 148 is configured to drive the mounting portion 142 to slide under external force.

In this embodiment, the handle 148 provides users with a clear and ergonomic force application point. When adjusting the position of the mounting portion 14, users do not need to exert force to grip structures such as the connecting portion 142 or sleeve portion 1422. Instead, they can naturally grasp or pinch the handle 148 to perform operations. The configuration of the handle 148 ensures more stable gripping, more direct force application, and precise control during the unlocking, sliding, and re-locking sequence of adjustment actions. This design enables the entire liquid pumping device's adaptation process to containers 2 of varying depths to be simpler and more efficient, achieving tool-free, single-handed operation for the liquid pumping device 1, thereby enhancing operational convenience and user experience.

In some embodiments, the mounting portion 14 is detachably mounted on the pipe 12, enabling removable installation and securement at any position along the pipe 12.

In this embodiment, the mounting portion 14 is configured to be removably mounted on the pipe 12. Exemplarily, the mounting portion 14 can be detached and reattached to the pipe 12 via specific connection structures (e.g., snap-fit, interference fit, binding mechanisms). When adjusting the effective working depth of the pump body 11 within the container 2, the user may first detach the entire mounting portion 14 from the pipe 12, then reinstall it at another suitable position on the pipe 12 that is closer to or farther from the pump body 11 based on the target depth, and finally secure the mounting portion 14 to the container 2. This removable-and-reinstallable adjustment method provides high adjustment freedom, enabling users to perform large-distance, non-continuous positional adjustments across the entire length of the pipe 12. The fully detachable design allows complete physical separation between the mounting portion 14 and the corresponding pipe segment, which not only facilitates cleaning, maintenance, or component replacement but also simplifies the packaging and transportation of the liquid pumping device 1.

In some embodiments, the pipe 12 includes a expandable portion 122 between the mounting portion 14 and the pump body 11, and the expandable portion 122 having an adjustable length.

In this embodiment, the expandable portion 122 is a specific region with telescoping or folding capabilities. Exemplarily, the implementation may include, but is not limited to, a corrugated pipe structure or a telescoping pipe structure formed by multi-layer nested pipe segments of the pipe 12, which are capable of relative sliding through interlocking mechanisms.

By adjusting the length of the expandable portion 122, the effective pipe length between the mounting portion 14 and the pump body 11 can be directly modified, enabling precise control over the operational depth of the pump body 11 within the container 2. For instance, when addressing deeper containers 2, the expandable portion 122 is extended to its maximum length; conversely, for shallower containers 2, the expandable portion 122 is compressed to a minimum configuration.

In this embodiment, since the adjustment mechanism is integrally embedded within the pipe 12, it eliminates the reliance on sliding and locking mechanisms between the mounting unit 14 and the pipe 12, or the need to detach the mounting unit 14 from the pipe 12. Users can directly manipulate the expandable portion 122 to achieve depth adjustment, ensuring user-friendly operation. The expandable portion 122 (e.g., a corrugated pipe), inherently possessing high flexibility, significantly enhances the adaptability of the pipe 12 in complex operating environments. Consequently, this embodiment provides a direct pipe-length adjustment solution of the pipe 12, expanding the compatibility of the liquid pump 1 with containers 2 of varying depths.

It should be noted that the pipe 12 may be configured in various types as required. For instance, the pipe 12 may be a corrugated hose, a smooth hose (with at least one of its inner or outer surfaces being smooth), a transparent hose, a smooth and transparent pipe, or a rigid pipe.

In some embodiments, the grip portion 13 includes an operating lever 131 and an automatic control circuit 132, the operating lever 131 is manually operable by external force to control the opening and closing of the liquid-transporting pipeline, and the automatic control circuit 132 is configured to automatically start/stop the pump body 11.

In this embodiment, the operating lever 131 functions as a mechanical control component that responds to manual force (e.g., pressing, levering) applied by the user, generating displacement or state changes. This mechanical motion is transmitted or converted into control signals to regulate the opening/closing of the liquid-transporting pipeline, that is, to open or close the pipeline. The operating lever 131 may also directly control the activation/deactivation of the pump body 11, providing users with intuitive manual operation. Within the operating lever 131, there is provided a conduit connected to the pipe 12. This conduit also transports liquid, and the opening or closing of the conduit can be controlled by operating the operating lever 131.

Furthermore, the grip portion 13 integrates an automatic control circuit 132 capable of automatically monitoring specific conditions during liquid pumping (e.g., detecting that the container 2 is full). Upon satisfying predefined thresholds, the circuit issues commands to activate/deactivate the pump body 11, thereby eliminating or reducing manual intervention.

By integrating the operating lever 131 and the automatic control circuit 132 together in the grip portion 13, the device has both manual and automatic dual control capabilities, allowing users to flexibly choose the control mode during operation: they can use the operating lever 131 to actively control the on/off function to meet the needs of temporary interruption or precise flow control; or they can rely on the automatic control circuit 132 to achieve automated operation of "stop when full" to prevent liquid spillage. This combination of manual and automatic control greatly enhances the convenience, flexibility, and safety of the operation of the liquid pumping device 1, and can meet the operation habits of different users and the requirements of different application scenarios at the same time. It should be noted that the grip portion 13 may also include only the operating lever 131 or only the automatic control circuit 132, and this embodiment does not impose any restrictions on this.

In some embodiments, the grip portion 13 further includes a control switch 133. The control switch is configured to be triggered by an external force to control the operating state of the liquid pumping device 1, wherein the operating state includes a working state and a stopped state.

In this embodiment, the control switch 133 is capable of responding to external trigger operations by the user (such as pressing, toggling, etc.) to directly control the working and stopped states of the liquid pumping device 1, thereby enhancing operational safety and the directness of control. Exemplarily, when the user triggers the switch to the "working state", the entire liquid pumping device 1 is powered on, causing it to enter the operational mode; whereas when triggered to the "stopped state", the main power supply of the liquid pumping device 1 is immediately cut off, causing it to cease operation.

By integrating the start/stop control of the liquid pumping device 1 into the grip portion 13, the user can easily access and operate the control switch 133 while holding the device, which is beneficial for handling emergency situations. When an immediate cessation of the liquid pumping operation is required, the user does not need to search for a switch in another location but can quickly cut off the power directly on the grip portion 13, thereby shortening the emergency response time and enhancing the reliability of the liquid pumping device 1 under various operating conditions.

In some embodiments, the grip portion 13 further includes a grip 134 and a base 135, wherein the base 135 is connected to the pipe 12 via the grip 134. The operating lever 131 is movably mounted on the base 135 and is located on the same side of the base 135 as the grip 134. The control switch 133 is configured on the base 135 and proximate to the grip 134.

This embodiment establishes a logically clear and user-friendly control center within the limited space of the grip portion 13. Specifically, the two most critical manual control elements, the operating lever 131 and the control switch 133, are centrally arranged in the operational area near the grip 134. This allows users to effortlessly reach and operate both components while holding the grip 134 with one hand during liquid pumping operations. Whether performing precise flow control via the operating lever 131 or quickly triggering the control switch 133 to cut power in emergencies, the required actions can be completed swiftly without altering the grip or using the other hand. It should be understood that the grip 134 and the base 135 contain fluid-conducting channels connected the pipe 12.

In some embodiments, the grip portion 13 further includes a liquid refill tube 136 configured for outputting liquid. The liquid refill tube 136 is connected to a side of the base 135 away from the grip 134. The automatic control circuit 132 includes a control circuit 1324 and a sensor 1322 electrically connected to the control circuit 1324. The control circuit 1324 is electrically connected to the pump body 11. The sensor 1322 is installed at a front end of the liquid refill tube 136 and configured to detect the quantity of liquid output. The control circuit 1324 controls the start and stop of the pump body 11 based on the detected liquid quantity.

In this embodiment, by installing the sensor 1322 on the liquid refilling tube 136 at its front end, where the liquid refilling tube 136 outputs liquid, the automatic control circuit 132 can obtain real-time, direct status information of the output liquid. The control circuit 1324 can automatically determine and control the operation of the pump body 11 based on liquid quantity parameters detected by the sensor 1322 through multiple methods: for example, by calculating the total output through cumulative flow measurement, or by indirectly determining the liquid level height of the target container 2 through monitoring the liquid level status at the outlet 21 of the liquid refilling tube 136, or by triggering the sensor when the liquid level contacts the sensor surface. When the control circuit 1324 determines based on signals from the sensor 1322 that the liquid has reached full capacity, it will automatically cut off power to the pump body 11 to stop the pumping operation. This enhances operational safety and convenience while effectively preventing waste and safety hazards caused by liquid spillage. Exemplarily, the automatic control circuit 132 may also include components such as a processing unit and corresponding control logic, which are not limited in this embodiment.

The liquid transfer device 1 may include one or more power supply configurations. For example, the device 1 may include at least one of the following: a battery power supply, a USB Type-C port power supply, or a DC 12V adapter port power supply. The battery may be a primary battery or a rechargeable battery. To prevent simultaneous use of the USB Type-C port and the DC 12 V adapter port and to enhance product safety, a swing plate is provided at the two ports. The swing plate is movable relative to the ports and is configured to expose one port while covering the other port, such that only one of the two ports is exposed at a time. When one port is in use, the swing plate covers the other port, providing a protective effect.

Referring to FIG. 19, FIG. 19 is a cross-sectional view of the mounting portion shown in FIG. 18 along the BB direction. The present disclosure further provides a liquid refilling apparatus including a container 2 and a liquid pumping device 1. The container 2 is configured for storing liquid, and the liquid pumping device 1 is mounted on the container 2 and configured to output liquid from the container 2. The liquid pumping device 1 may be any one of the liquid pumping devices 1 described in the aforementioned embodiments, which will not be reiterated herein.

In some embodiments, the container 2 is provided with an outlet 21. The container 2 has an annular wall 22 protruding outward and surrounding the outlet 21. The mounting portion 14 of the liquid pumping device 1 clamps the annular wall 22.

In this embodiment, the mounting portion 14 does not rely on specific structures of the outlet 21 of the container 2, such as specific threads or protrusions, but instead is securely attached to the annular wall 22 around the outlet 21 of the container 2 solely through its inherent clamping force. This clamping method avoids compatibility issues caused by the varied interface specifications of the container 2. Regardless of the size or shape of the outlet 21 of the container 2, as long as the annular wall 22 can be effectively clamped by the clamping portion 144, a stable and reliable fixation point is provided for the entire liquid pumping device 1. The user does not need to search for or switch any dedicated adapter; instead, simply perforated opening and clamping the clamping portion 144 like a clamp onto the edge of the outlet 21 of the container 2 completes the rapid installation. This method of clamping the annular wall 22 not only ensures the stability of the mounting portion 14, preventing accidental shaking or detachment of the pump body 11 during liquid pumping, but also enables compatibility with the vast majority of common containers 2. Consequently, it enhances the universality and ease of operation of the liquid pumping device 1, thereby improving user experience.

It should be understood that the container 2 may be a barrel, enclosure, tank, or cassette, etc. The liquid may be configured as needed, such as gasoline, diesel, kerosene, or other solvents. The liquid refilling apparatus can add liquid to fuel tanks of automobiles, motorcycles, yachts, lawn tractors, and similar equipment. For example, the liquid pumping device 1 may function as a gas pump, with the container 2 serving as an oil drum.

The descriptions of various embodiments provided above each emphasize different aspects. For details not comprehensively discussed in a particular embodiment, reference may be made to the corresponding descriptions in other embodiments. The embodiments, implementation modes, and related technical features of the present disclosure may be combined or substituted with each other where there is no conflict.

The foregoing detailed description has provided specific examples of the liquid pumping device and liquid refilling apparatus according to the embodiments of the present disclosure, illustrating the principles and implementation modes of the present disclosure. These embodiments are merely intended to facilitate understanding of the methods and core concepts of the present disclosure. For those skilled in the art, various modifications in specific implementation modes and application scopes may be made based on the concepts of the present disclosure. Accordingly, the content of this specification should not be construed as limiting the scope of the present disclosure.

What is claimed is:

1. A liquid pumping device, comprising:

a pump body configured to be disposed within a container for pumping liquid from the container;

a pipe connected to the pump body for transporting the liquid; and a grip portion connected to a distal end of the pipe away from the pump body, the grip portion being connected to the pump body and capable of controlling the pump body; wherein the grip portion comprises a swing plate and a plurality of power supply interfaces, the plurality of power supply interfaces at least comprise a first power supply interface and a second power supply interface of different types, the swing plate is movable, and the swing plate exposes the first power supply interface and covers the second power supply interface in a first position, and exposes the second power supply interface and covers the first power supply interface in a second position.

2. The liquid pumping device according to claim 1, wherein the grip portion further comprises a base and a circuit board, the circuit board being disposed within the base, the circuit board having the first power supply interface and the second power supply interface, the base having a first opening and a second opening, the first opening being aligned with the first power supply interface, and the second opening being aligned with the second power supply interface;

the swing plate being rotatably connected to the base, the swing plate being configured to cover at least one of the first opening and the second opening, and the swing plate being configured to expose either the first opening or the second opening.

3. The liquid pumping device according to claim 2, wherein the swing plate comprises a plate body and an actuating portion, the plate body being disposed within the base, the actuating portion being disposed outside the base, the actuating portion being configured to drive rotation of the plate body, the plate body having a third opening and a fourth opening;

the first power supply interface being exposed when the third opening is aligned with the first opening, the second power supply interface being exposed when the fourth opening is aligned with the second opening.

4. The liquid pumping device according to claim 3, wherein the swing plate covers the first power supply interface and the second power supply interface when the swing plate is rotated to a third position.

5. The liquid pumping device according to claim 4, wherein the base comprises a first limiting portion, the actuating portion comprises a second limiting portion, and the first limiting portion and the second limiting portion are limitingly engageable with each other to limit the swing plate to at least one of the first position, the second position, and the third position.

6. The liquid pumping device according to claim 5, wherein the first limiting portion comprises a plurality of limiting protrusions, the second limiting portion comprises a mating recess, the plurality of limiting protrusions are spaced apart and disposed on the base; and during rotation of the swing plate relative to the base, the mating recess is configured to engage with any one of the limiting protrusions to position the swing plate at the first position, the second position, or the third position.

7. The liquid pumping device according to claim 6, wherein the swing plate further comprises a rotation shaft, the plate body and the actuating portion are both connected to the rotation shaft, the actuating portion and the plate body are located on opposite sides of the base; and the actuating portion comprises a first end and a second end opposite to each other, the first end being connected to the rotation shaft, a side of the second end facing toward the base comprising the mating recess, the base comprising a plurality of the limiting protrusions protruding from an outer side thereof.

8. The liquid pumping device according to claim 7, wherein the base comprises a first sub-shell and a second sub-shell configured in a split configuration, the first sub-shell and the second sub-shell being assembled together to form the base, the first sub-shell comprising an outer plate and a bracket, the outer plate being located at an outermost side of the first sub-shell, the bracket being located inside the first sub-shell and opposite to the outer plate;

a rotation hole being configured on a side of the bracket facing the outer plate, the rotation shaft passing through the outer plate, and a portion of the rotation shaft being located within the rotation hole.

9. The liquid pumping device according to claim 8, wherein the bracket comprises a sidewall located on a side of the rotation hole facing toward the second sub-shell, the sidewall comprising a guiding portion configured to guide the rotation shaft into the rotation hole.

10. The liquid pumping device according to claim 9, wherein the guiding portion comprises a sloped surface, the sloped surface being inclined from the rotation hole toward the second sub-shell and away from the outer plate.

11. The liquid pumping device according to claim 8, wherein an edge of the plate body comprises a positioning groove facing toward the outer plate, the outer plate comprising a limiting block protruding toward the positioning groove, the limiting block being configured to snap into the positioning groove to limit rotation of the plate body; or an edge of the plate body comprising a positioning groove facing toward the bracket, the bracket comprising a limiting block protruding toward the positioning groove, the limiting block being configured to snap into the positioning groove to limit rotation of the plate body.

12. The liquid pumping device according to claim 11, wherein the positioning groove comprises a first slot wall and a second slot wall opposite the first slot wall along a rotation direction of the plate body, the first wall and the second wall being inclined and interconnected, the limiting block having a shape complementary to the positioning groove, and the first wall and the second wall being configured to restrict movement of the limiting block in the rotation direction of the plate body when the limiting block is located along the positioning groove.

13. The liquid pumping device according to claim 6, wherein the base further comprises two stop portions spaced apart along the rotation direction of the swing plate, the two stop portions being located on a rotation trajectory of the swing plate to limit a rotation range of the swing plate, and the plurality of limiting protrusions being located between the two stop portions.

14. The liquid pumping device according to claim 13, wherein the plurality of limiting protrusions comprise a first limiting protrusion, a second limiting protrusion, and a third limiting protrusion, the second limiting protrusion being located between the first limiting protrusion and the third limiting protrusion along the rotation direction of the swing plate;

and wherein when the mating recess engages with the first limiting protrusion, the swing plate is in the first position; when the mating recess engages with the second limiting protrusion, the swing plate is in the second position; and when the mating recess engages with the third limiting protrusion, the swing plate is in the third position.

15. The liquid pumping device according to claim 14, wherein the first limiting protrusion is adjacent to one of the stop portions, and the third limiting protrusion is adjacent to the other of the stop portions.

16. The liquid pumping device according to claim 2, wherein the grip portion further comprises a control switch connected to the circuit board, the control switch being configured to control the circuit board, the control switch and the first power supply interface being located on opposite sides of the grip portion.

17. The liquid pumping device according to claim 1, wherein the first power supply interface comprises one of a USB interface, a Type-C interface, a Micro-USB interface, and a Lightning interface, the second power supply interface comprising a DC interface.

18. The liquid pumping device according to claim 1, wherein the grip portion further comprises a battery compartment configured to accommodate one or more batteries; or the grip portion further comprises a battery, the battery comprising a non-rechargeable battery or a rechargeable battery.

19. A liquid refilling apparatus comprising:

the container for storing liquid; and the liquid pumping device as claimed in claim 1, mounted on the container and configured to output liquid from the container.

* * * * *